(12) United States Patent
Krebs et al.

(10) Patent No.: US 10,189,965 B2
(45) Date of Patent: Jan. 29, 2019

(54) PRODUCTION OF VISCOELASTIC POLYURETHANE SYSTEMS USING BLOCK POLYMERS HAVING BONDED SILOXANE BLOCKS AS CELL OPENERS

(71) Applicant: Evonik Degussa GmbH, Essen (DE)

(72) Inventors: Michael Krebs, Duesseldorf (DE); Roland Hubel, Essen (DE); Michael Ferenz, Essen (DE); Marco Wolf, Wesel (DE); Thomas Guenther, Neuss (DE)

(73) Assignee: Evonik Degussa GmbH, Essen (DE)

(*) Notice: Subject to any disclaimer, the term of this patent is extended or adjusted under 35 U.S.C. 154(b) by 0 days.

(21) Appl. No.: 14/857,399

(22) Filed: Sep. 17, 2015

(65) Prior Publication Data

US 2016/0075846 A1 Mar. 17, 2016

(30) Foreign Application Priority Data

Sep. 17, 2014 (DE) ........................ 10 2014 218 635

(51) Int. Cl.

| | |
|---|---|
| C08G 18/20 | (2006.01) |
| C08G 18/24 | (2006.01) |
| C08G 18/28 | (2006.01) |
| C08G 18/48 | (2006.01) |
| C08G 18/76 | (2006.01) |
| C08G 77/46 | (2006.01) |
| C08G 77/50 | (2006.01) |
| C08J 9/00 | (2006.01) |
| C08J 9/12 | (2006.01) |
| C08G 77/14 | (2006.01) |
| C08G 77/20 | (2006.01) |
| C08G 77/42 | (2006.01) |
| C08G 77/00 | (2006.01) |

(52) U.S. Cl.
CPC .......... *C08J 9/125* (2013.01); *C08G 18/2063* (2013.01); *C08G 18/244* (2013.01); *C08G 18/2825* (2013.01); *C08G 18/4841* (2013.01); *C08G 18/7621* (2013.01); *C08G 18/7664* (2013.01); *C08G 77/46* (2013.01); *C08G 77/50* (2013.01); *C08J 9/0042* (2013.01); *C08G 77/14* (2013.01); *C08G 77/20* (2013.01); *C08G 77/42* (2013.01); *C08G 77/70* (2013.01); *C08J 2375/08* (2013.01)

(58) Field of Classification Search
CPC ........ C08G 77/46; C08G 77/14; C08G 77/20; C08G 77/42; C08G 77/70; C08J 9/0042
See application file for complete search history.

(56) References Cited

U.S. PATENT DOCUMENTS

| | | | |
|---|---|---|---|
| 3,346,557 A | 10/1967 | Patton, Jr. et al. | |
| 3,836,560 A | 9/1974 | Prokai et al. | |
| 5,223,547 A * | 6/1993 | Harada | C08G 18/1825 521/131 |
| 5,565,194 A | 10/1996 | Burkhart et al. | |
| 6,291,622 B1 | 9/2001 | Droese et al. | |
| 6,730,749 B1 | 5/2004 | Burkhart et al. | |
| 6,762,274 B2 | 7/2004 | Waddington et al. | |
| 6,924,321 B2 | 8/2005 | Casati et al. | |
| 7,157,541 B2 | 1/2007 | Knott et al. | |
| 7,825,209 B2 | 11/2010 | Knott et al. | |
| 8,030,366 B2 | 10/2011 | Ferenz et al. | |
| 8,334,355 B2 | 12/2012 | Henning et al. | |
| 8,841,403 B2 | 9/2014 | Schmitz et al. | |
| 8,946,369 B2 | 2/2015 | Henning et al. | |
| 2004/0254256 A1 | 12/2004 | Lockwood et al. | |
| 2006/0160913 A1* | 7/2006 | Sasaki | C08G 18/4072 521/174 |
| 2008/0071057 A1* | 3/2008 | Tsuge | C08G 18/10 528/44 |
| 2009/0088489 A1 | 4/2009 | Terheiden et al. | |
| 2009/0170972 A1* | 7/2009 | Sonney | C08G 18/36 521/88 |
| 2012/0190760 A1 | 7/2012 | Henning et al. | |
| 2012/0190762 A1 | 7/2012 | Hubel et al. | |
| 2013/0035407 A1 | 2/2013 | Lobert et al. | |
| 2013/0035409 A1 | 2/2013 | Hubei et al. | |
| 2013/0035412 A1 | 2/2013 | Schmitz et al. | |
| 2013/0150472 A1 | 6/2013 | Hubel et al. | |
| 2013/0190414 A1 | 7/2013 | Terheiden et al. | |
| 2014/0058004 A1 | 2/2014 | Schmitz et al. | |

(Continued)

FOREIGN PATENT DOCUMENTS

| | | |
|---|---|---|
| CA | 2008639 | 8/1990 |
| DE | 19859759 C1 | 12/1998 |
| DE | 102006061351 A1 | 6/2008 |
| EP | 0380993 A2 | 8/1990 |
| EP | 0493836 | 7/1992 |
| EP | 1095968 A1 | 5/2001 |
| EP | 1240228 B1 | 8/2003 |
| EP | 1350804 A1 | 10/2003 |
| EP | 1520870 A1 | 4/2005 |
| EP | 2104696 A0 | 9/2009 |
| EP | 2182020 A1 | 5/2010 |
| WO | WO0158976 A1 | 8/2001 |
| WO | WO0222702 A1 | 3/2002 |

(Continued)

OTHER PUBLICATIONS

The Dow Chemical Company, Dow Polyurethane—Foam Preparation Calculations, Dec. 2014, p. 1-3.*

*Primary Examiner* — Melissa A Rioja
(74) *Attorney, Agent, or Firm* — Nexsen Pruet, PLLC; Philip P. McCann

(57) ABSTRACT

The use of bonded siloxane block polymers of the general average formula (I) $M_a M^1_b D_c D^1_d T_e Q_f G_g$ as additive in the production of PUR foam using at least one polyol component and at least one isocyanate component, wherein the polyol component used has an average hydroxyl number, determined to DIN 53240-1:2012-07, of >56 to <450 mg KOH/g, preferably 57-300 mg KOH/g, and wherein the PUR foam is produced at an isocyanate index of 65 to 108, is described.

17 Claims, No Drawings

(56) References Cited

U.S. PATENT DOCUMENTS

2015/0031781 A1 1/2015 Landers et al.
2015/0158968 A1 6/2015 Schmitz et al.

FOREIGN PATENT DOCUMENTS

| WO | WO03029320 | 4/2003 |
| WO | WO2004060956 | 7/2004 |
| WO | WO2005063841 | 7/2005 |
| WO | WO2006055396 | 5/2006 |
| WO | WO2007146351 A2 | 12/2007 |
| WO | WO2008079614 A1 | 7/2008 |
| WO | WO2009035563 A1 | 3/2009 |
| WO | WO2013102053 A1 | 7/2013 |

\* cited by examiner

PRODUCTION OF VISCOELASTIC POLYURETHANE SYSTEMS USING BLOCK POLYMERS HAVING BONDED SILOXANE BLOCKS AS CELL OPENERS

FIELD OF THE INVENTION

The present invention is in the field of polyurethanes and in the field of the siloxanes. More particularly, the present invention especially relates to viscoelastic polyurethane systems and to a process for producing such polyurethane systems using particular bonded siloxane block polymers.

BACKGROUND OF THE INVENTION

A variety of different polyurethanes are typically prepared by the polymerization of diisocyanates, for example 4,4'-methylenebis(phenyl isocyanate), MDI for short, or tolylene 2,4-diisocyanate, TDI for short, with polyether polyols or polyester polyols. Polyether polyols can be produced, for example, by alkoxylation of polyhydroxy-functional starters. Commonly used starters are, for example, glycols, glycerol, trimethylolpropane, pentaerythritol, sorbitol or sucrose. In the production of polyurethane foams, one of the most important polyurethane systems, additional blowing agents are typically used, examples being pentane, methylene chloride, acetone or carbon dioxide. Water is usually used as chemical blowing agent, which reacts with isocyanate to give polyurea with elimination of carbon dioxide. Typically, the polyurethane foam is stabilized using surface-active substances, especially silicone surfactants.

Polyurethane foams have outstanding mechanical and physical properties and so are used in a very wide variety of fields. The automotive and furniture industries are a particularly important market for various PUR foams (=polyurethane foams), such as conventional flexible foams based on ether and ester polyols, cold-cure foams (frequently also referred to as HR foams), rigid foams, integral foams and microcellular foams and also foams with properties between these classifications, for example semi-rigid systems.

A specific class of polyurethane foams is that of viscoelastic foams. These are also known by the "memory foam" name and are notable both for a low rebound resilience (preferably <10%, whereas the rebound resilience of conventional flexible PUR foams is 35%-45%) and for a slow, gradual recovery after compression (recovery time preferably 2-10 seconds). Materials of this kind are well known in the prior art and are highly valued for their energy- and sound-absorbing properties. Viscoelastic foam materials are encountered in a multitude of fields of use for cushioning (for example, in cushions, seat covers, mattresses, etc.), as sound- and/or vibration-deadening materials, or as impact protection. Typical viscoelastic foams have lower porosity and high density compared to standard flexible ether polyurethane foams. Cushions having a density of usually 30-50 kg/$m^3$ are at the lower end of the density scale typical of viscoelastic foams, whereas mattresses often have a density in the range of 60-130 kg/$m^3$.

Among the viscoelastic foam materials, those made from polyurethanes are of the greatest significance. This is firstly because it is possible, through the choice of the polyol and isocyanate components and of any further auxiliaries used, to very precisely adjust the physical properties of the resultant polyurethane foam, and secondly also because it is possible, through "in situ" production (optionally on site), to produce foam materials of virtually any shape and structure, including very complex shapes and structures.

The majority of the conventional polyurethane foams are block copolymers which have spatially separate regions of different phases having high and low glass transition temperatures (TG). The glass transition temperature divides the brittle energy-elastic region (=glass region) below it from the soft entropy-elastic region above it (=elastomeric region). These high and low glass transition temperatures of different phases within the polymer normally define the temperature range within which the material can be used. The DMA ("dynamic mechanical analysis") spectra of such materials typically feature a relatively flat region ("modulus plateau") between the different glass transitions.

The phase of low glass transition temperature in these materials typically (but not always) derives from a "block" of low glass transition temperature, which is preformed and only then subjected to the polymerization. The phase of high glass transition temperature, in contrast, does not normally form until during the polymerization, as a result of the concurrent formation of urethane units. The block of low glass transition temperature (often also referred to as "soft block") typically derives from a liquid or from an oligomeric resin of low melting temperature, which contains a multitude of groups reactive toward isocyanate units. Polyether polyols and polyester polyols are examples of such oligomeric resins.

In conventional polyurethanes, the hard phases (high glass transition temperature) and soft phases (low glass transition temperature) become arranged with respect to one another during the polymerization and then separate spontaneously from one another in order to form morphologically different phases within the "bulk polymer". Such materials are also referred to correspondingly as "phase-separated" materials. In this context, viscoelastic polyurethanes are a special case where the above-described phase separation occurs only incompletely, if at all. The glass transition temperature of viscoelastic foams is preferably between −20 and +15° C., but the glass transition temperature of standard flexible polyurethane foams is regularly below −35° C.

Such "structural viscoelasticity" in the case of polyurethane foams having (predominantly) open cells should be distinguished from viscoelasticity attributable to a pneumatic effect. This is because, in the latter case, virtually closed cells are present within the foam material, i.e., only slightly opened cells. As a result of the small size of the orifices, the air flows back in only gradually after compression, which results in slowed recovery. Examples of such viscoelastic foams based on a pneumatic effect are the commercially available products Cosypur® and Elastoflex® from BASF Polyurethanes GmbH.

In general, viscoelastic polyurethane foams are more difficult to produce on a commercial scale than conventional flexible PUR foams. The foaming itself and the curing of the resultant foam are very sensitive to disturbances. Small variations in the composition (for example in the event of variations in the catalyst loading) or in the process regime can lead quickly to reject material. The amount of water in the case of production of viscoelastic PUR foams having typically less than 3 pphp (parts per hundred parts polyol) is smaller than in the case of conventional flexible PUR foams. This fact, in combination with the use of specific polyols, makes it much more difficult to produce viscoelastic PUR foams.

In formulations for production of viscoelastic PUR foams, relative to the amount of water molecules, there are far more polyol hydroxyl groups available for a reaction with isocyanate groups than in formulations for production of conventional flexible PUR foams. The increased competition between polyol and water molecules slows the blowing reaction and hence the formation of $CO_2$. This also results in slowing of the chain extension based on the formation of urea segments. The resulting changes in the blowing and gel reactions frequently lead to unstable structures in the foam or to collapses.

There have already been many descriptions in the prior art of processes for synthesis of polyurethane foams having structural viscoelasticity, these usually having the common feature of the use of a specific polyol composition, in addition to an isocyanate component, which can be chosen more or less freely. Thus, the viscoelastic properties which result from a rise in the glass transition temperature to room temperature are frequently obtained through a combination of various measures during the foaming process. Usually, this specific polyol mixture consists of various polyols. Often, plasticizers are also used.

As well as the above-described problems in the production of viscoelastic PUR foams, it is common knowledge that the cell opening is a particularly critical step in the production of such foams. Particularly when TDI T80 is used as isocyanate component, there is frequently severe shrinkage as a result of insufficient cell opening, which in turn makes it more difficult to run the process.

Furthermore, there is a general trend toward higher foam densities. This is achieved through the use of MDI/TDI mixtures or the use of MDI as the sole isocyanate source. However, higher densities entail a lower water content and hence a lower proportion of chemical blowing agent in the foam formulation. The reduction in the water level results in a smaller amount of urea formed, which in turn results in a foam having lower porosity. In order to compensate for this level of closed cells, large amounts of cell opener are often used in such formulations (for example often more than 3 parts per hundred parts polyol (pphp)). However, large amounts of cell openers frequently have adverse effects on the cell structure and mechanical properties (tensile strength, compression set, expansion, etc.) of the foam.

The polyalkylene oxide cell openers described in WO 2007/146351 are very effective even in small use amounts and are usable in various foam densities and formulations (TDI, MDI or mixtures thereof), but the amount of silicone stabilizer has to be increased considerably for a fine cell structure.

Various further means are known in the prior art for opening of closed cells in flexible polyurethane foams.

For instance, it is possible to open the cells in flexible polyurethane foams by a mechanical route, by flexing the corresponding mouldings after demoulding. This method is commonplace, but is both time-consuming and energy-intensive and is employable only in the production of mouldings.

In addition, the open-cell content of viscoelastic polyurethane foams can be improved by using, as compounds having at least two hydrogen atoms reactive with isocyanate groups, mixtures of at least one polyether alcohol having a high content of ethylene oxide, preferably at least 50% by weight, and at least one polyether alcohol which is incompatible with these polyether alcohols and has a high content of propylene oxide, preferably at least 90% by weight. Thus, U.S. Patent Application Publication No. 2004/0254256 describes viscoelastic foams produced with a polyol component containing 30 to 70 parts by weight of a polyether alcohol having a high proportion of ethylene oxide units in the polyether chain. EP 1 240 228 describes the production of viscoelastic foams using polyether alcohols having an ethylene oxide content in the polyether chain of at least 50% by weight and a hydroxyl number in the range between 40 and 50 mg KOH/g. The use of the ethylene oxide-rich polyether alcohols does increase the open-cell content of the foams, but a disadvantage of the use of polyether alcohols having a high proportion of ethylene oxide in the chain is the increase in the hydrophilicity of the foams. As a result, these foams swell up to 40% by volume on contact with water. This swelling behaviour is unacceptable particularly for applications in moist environments.

Cell openers used in the prior art are still various kinds of additives. For instance, solid particles are frequently used for opening of polyurethane foams. For example, $CaCO_3$ is a standard filler in the PU industry. However, the cell-opening properties of calcium carbonate are usually too low for viscoelastic applications. Very large amounts are required and, even when 15 pphp are used, the result is frequently nevertheless shrinkage of the viscoelastic PUR foams. These high use amounts then additionally lead to an altered cell structure and altered mechanical properties.

A standard method for opening the cells of water-blown polyurethane foams is the use of incompatible liquids, called defoamers. The incompatible liquids, i.e., defoamers, are immiscible with the polyol/isocyanate reaction mixture, but can influence the silicone stabilizers in the reaction mixture at the phase interface and thus facilitate cell opening. Typically, dimethylsiloxanes (silicone oils) are used for this purpose. A known problem with the use of silicone oils is that they promote cell opening at a very early stage of foam formation and hence destabilize the foam. A further disadvantage of the use of silicone oils as cell openers is the very narrow processing window and the usually very coarse cell structure of the resultant foams. In addition, it is also possible to use mineral oils as incompatible liquids. Although these are effective cell openers, mineral oils lead to an oily surface and hence to an unwanted tactile perception of the foams. However, there are also incompatible liquids which are indeed possible cell openers. A problem frequently encountered with incompatible liquids used as cell openers is the unpleasant odour and poor emission characteristics, for example determined in accordance with the test chamber method based on the DIN standard DIN EN ISO 16000-9:2008-04, 24 hours after test chamber loading, as elucidated in detail in the examples section among other places.

A further approach is the use of linear block copolymers consisting of polydimethylsiloxane blocks and polyether blocks [(polyether)(polydimethylsiloxane)]$_n$, as described in U.S. Pat. No. 3,836,560 and DE 10 2006 061 351 A1. These $(AB)_n$ structures (i.e., copolymers) are capable of stabilizing the foam in the formation phase by preventing the coalescence of the gas bubbles. At the end of the foam-forming reaction, the $(AB)_n$ structures then facilitate cell opening. Below 30 000 g/mol, the $(AB)_n$ copolymers have a minor stabilizing effect, and for that reason the minimum average molar mass is typically 30 000 g/mol, preferably between 65 000 g/mol and 100 000 g/mol. However, a problem is that these copolymer structures have a tendency to form hydrogels in the presence of water, which restricts the field of use thereof to a very high degree. A second problem with such $(AB)_n$ structures is that the control of the molecular weight during production is not trivial, which leads to a complex process regime. Furthermore, such structures are usually highly viscous because of their high molecular weight, which can lead to difficulties in handling on the part of the processor conducting foaming operations.

In view of the above, there is a need to provide a polyurethane foam (especially a viscoelastic polyurethane foam) having a fine cell structure and a high open cell content.

SUMMARY OF THE INVENTION

The present invention uses particular bonded siloxane block polymers as an additive in the production of polyurethane foams (especially viscoelastic polyurethane foams) having a fine cell structure and a high open cell content.

The invention provides for the use of bonded siloxane block polymers of the general average formula (I)

$$M_a M^1_b D_c D^1_d T_e Q_f G_g \qquad \text{formula (I)}$$

with

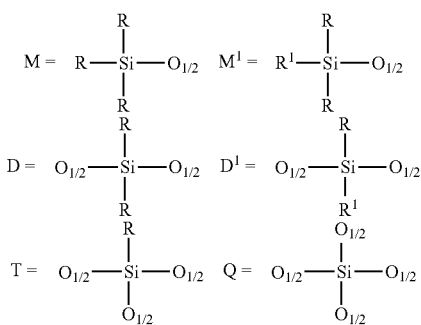

G=independently identical or different radicals from the group of:
$(O_{1/2}\!-\!)_n SiR_m\!-\!CH_2CHR^3\!-\!R^2\!-\!CHR^3CH_2\!-\!SiR_m\!(\!-\!O_{1/2})_n$,
$(O_{1/2}\!-\!)_n SiR_m\!-\!CH_2CHR^3\!-\!R^2\!-\!CR^3\!=\!CH_2$,
$(O_{1/2}\!-\!)_n SiR_m\!-\!CH_2CHR^3\!-\!R^2\!-\!CR^3\!=\!CR^3\!-\!CH_3$
a=0-20, preferably 0-10, e.g. 1-8 or 2-8, especially 2.4-4.1,
b=0-20, preferably 0-10, e.g. 1-8 or 2-8, especially 0,
c=3-450, preferably 5-350, e.g. 5-300, especially 10-250,
d=0-40, preferably 1-30, e.g. 1-20, especially 1.5-20,
e=0-20, preferably 0-10, e.g. 1-8, especially 0,
f=0-20, preferably 0-10, e.g. 1-8, especially 0,
g=0.1-3, preferably 0.15-2, especially 0.2-1.5,
where a+b≥2 and N=a+b+c+d+e+f+g≥11 and ≤500, b+d≥1,
R=independently identical or different alkyl radicals having 1-16 carbon atoms or aryl radicals having 6-16 carbon atoms or H or $-\!OR^3$, preferably methyl, ethyl, phenyl, octyl, dodecyl or H, especially methyl,
$R^1$=independently identical or different polyether radicals, preferably identical or different polyether radicals of the general formula (II)

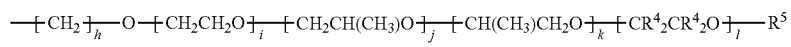

$R^2$=independently identical or different divalent organic radicals, preferably identical or different divalent organic radicals which have 1-50, more preferably 2-30, carbon atoms and are optionally interrupted by ether, ester or amide functions or $(-\!SiR_2O\!-\!)_n$ groups and optionally bear OH functions,
$R^3$=independently identical or different alkyl radicals having 1-16 carbon atoms or aryl radicals having 6-16 carbon atoms or H,
$R^4$=identical or different alkyl radicals which have 1 to 18 carbon atoms and optionally have ether functions, or aryl radicals which have 6-18 carbon atoms and optionally have ether functions, or H, preferably H, ethyl and benzyl,
$R^5$=identical or different radicals from the group of: $R^3$, H, $-\!C(O)R^3$, preferably methyl, butyl, H or $-\!C(O)$Me,
n=independently 1 or 2,
m=independently 1 or 2,
m+n=3,
h=2-18, preferably 2-10, especially preferably 3,
i=0-100, preferably 0-80, especially preferably 0-50, e.g. 1-40,
j=0-100, preferably 0-80, especially preferably 0-50, e.g. 1-40,
k=0-100, preferably 0-80, especially preferably 0-50, e.g. 1-40,
l=0-80, preferably 0-40, e.g. 1-30, especially preferably 0, with the proviso that i+j+k+l≥3,
as additive in the production of polyurethane foam, especially viscoelastic polyurethane foam, using at least one polyol component and at least one isocyanate component, wherein the polyol component used overall has an average hydroxyl number, determined to DIN 53240-1:2012-07, of >56 to <450 mg KOH/g, preferably 57-300 mg KOH/g, and wherein the PUR foam is produced at an isocyanate index of 65 to 108.

For description of the siloxanes, a notation analogous to the literature: Walter Noll, Chemie and Technologie der Silicone [Chemistry and Technology of the Silicones], Verlag Chemie GmbH, 2nd edition, 1968, is chosen here. The inventive polyether siloxanes have different siloxane units which may be combined with one another in the molecule in different ways. The composition of the siloxane units is calculated taking account of the fact that every oxygen atom preferably functions as a bridging member between two silicon atoms in each case, and each silicon atom accordingly only has to be counted as half. The various siloxane units are joined to one another via 2 half oxygen atom $(-\!O_{1/2}O_{1/2}\!-\!)$ groups, as a result of which an oxygen bridge $(-\!O\!-\!)$ is shown.

The isocyanate index is an index firmly established in the field of polyurethanes and describes the ratio of isocyanate actually used to calculated isocyanate (for a stoichiometric reaction with polyol), multiplied by 100. An index of 100 represents a molar ratio of 1:1 for the reactive groups.

The subject matter of the invention enables the surprisingly simple provision of (preferably viscoelastic) polyurethane foam having particularly a fine cell structure and a high open cell content. Foam production results in particularly high-grade foams with good, stable and homogeneous foam structure, and favourable fire properties in the event of fire. It is possible in the present invention to employ the usual production plants. Further advantages of the invention are that the inventive products of the formula (I), also called siloxanes of the formula (I), are easy to handle, especially have low viscosity, and are advantageously hydrolysis-stable, low in emissions and virtually odour-neutral. The siloxanes of formula (I) have a broad processing window and are producible in a reproducible manner by standard methods. The inventive use of the siloxanes of the formula (I) does not lead to any adverse effects in the physical properties of the (preferably viscoelastic) foam. More particularly, tensile strength, compression set and expansion of the foam are not impaired.

The inventive use thus enables the simple provision of particularly high-grade viscoelastic polyurethane foams.

The polyurethane foam obtainable in accordance with the invention preferably has a rebound resilience, measured in the ball rebound test to DIN EN ISO 8307:2007, of less than 10%, preferably from 0% to 7.5%. The gas permeability of the polyurethane foam obtainable in accordance with the invention is preferably from 1 to 300 mm water column, preferably 5 to 200 mm water column, based on DIN ISO 4638:1993-07 (measured via measurement of the pressure differential in the course of flow through a foam sample. For this purpose, a foam sheet of thickness 5 cm is placed onto a smooth base. A plate of weight 800 g (10 cm×10 cm) having a central hole (diameter 2 cm) and a hose connection is placed onto the foam sample. Through the central hole, a constant air stream of 8 l/min is passed into the foam sample. The pressure differential that occurs (relative to unhindered outflow) is determined by means of a water column in a graduated pressure gauge. The more closed the foam is, the more pressure is built up and the more the level of the water column is forced downward and the greater the values that are measured; foams are referred to as closed from about 300 mm water column).

The density of the polyurethane foam obtainable in accordance with the invention is preferably 15 to 150 kg/m$^3$, preferably 30 to 140 kg/m$^3$ and more preferably 35 to 130 kg/m$^3$ (measured to DIN EN ISO 845:2009-10).

The pore structure (mean number of cells per 1 cm) in the polyurethane foam obtainable in accordance with the invention is preferably from 5 to 25 cells/cm and is determined visually on a section area (measured to DIN EN 15702).

The polyurethane foam obtainable in accordance with the invention advantageously has, at 40% compression, a compression set of preferably 0.1 kPa to 5 kPa, preferably 0.5 to 2 kPa, determined to DIN EN ISO 3386-1:1997+A1:2010. The cell structure of the polyurethane foam obtainable in accordance with the invention preferably has more than 80% open cells (measured to DIN ISO 4590).

Preferred polyurethane foams obtainable in accordance with the invention are those in which two or more of the abovementioned preferred parameters (rebound resilience, density, pore structure, compressive stress, cell structure), preferably all the above mentioned parameters, are within preferably the narrowest range specified.

The inventive use also enables the simple provision of hot-cure flexible polyurethane foam, especially of a hot-cure flexible polyurethane foam based on polyether polyols. Hot-cure flexible polyurethane foam, according to DIN 7726, has a compression set on compressive stress of preferably less than 15 kPa (measured to DIN 53421).

It has been found that, surprisingly, the inventive siloxane of the formula (I) functions as a cell opener in the production of polyurethane foams (especially viscoelastic polyurethane foams).

Still further advantages of the invention are that it enables the provision of polyurethane foam (especially viscoelastic polyurethane foam) having reduced emissions, the provision of low-odour polyurethane foam (especially viscoelastic polyurethane foam), and the avoidance of shrinkage in the production of polyurethane foam (preferably viscoelastic polyurethane foam).

"Reduced emissions" in the context of the present invention especially comprise emission of volatile organic compounds (VOCs) from the polyurethane foam (especially viscoelastic polyurethane foam) of <500 µg/m$^3$, appropriately determined by the test chamber method based on DIN standard DIN EN ISO 16000-9:2008-04, 24 hours after test chamber loading. The methods of determination which were chosen for the purposes of the present invention are in accordance with DIN standard DIN EN ISO 16000-9:2008-04 and are detailed in the examples section.

Low-odour here means that the resulting polyurethane system has a minimum level of product odour, especially with use of the inventive siloxane of the formula (I) as alternative cell openers to prior art cell openers, which can be verified especially by olfactory testing by a panel of trained olfactory testers. The determination methods chosen in the context of the present invention are elucidated in detail in the examples section.

In principle, polyether-modified polyether siloxanes have an adverse effect on the combustibility of polyurethane foams. However, it is possible to influence the fire characteristics via the structure of the siloxane. Used in combination with flame retardants for applications with particularly high demands on fire characteristics (such flame retardants can be referred to as FR stabilizers, which differ structurally from conventional polyether siloxanes in the type and number of linked polyether chains and thus have a positive influence on fire characteristics; for example, it is thus possible to reduce the amount of flame retardant. Advantageously, the invention makes a contribution to the provision of polyurethane foams (especially viscoelastic polyurethane foams) having improved flame retardancy properties, such that it is possible to meet high demands on the fire characteristics in a simpler manner.

The inventive use wherein the siloxane of the formula (I) is employed in the form of an additive composition comprising 0% to 90% by weight, preferably 10% to 80% by weight, more preferably 20% to 70% by weight, based on the overall additive composition, of one or more inorganic or organic solvents, preferably selected from water, alcohols, especially polyether monools or polyether polyols, preferably consisting of H-functional starter substances onto which have been added, by means of alkoxylation, alkylene oxides (epoxides) having 2-24 carbon atoms, preferably ethylene oxide and/or propylene oxide, and which have a molecular weight of preferably 200-8000 g/mol, more preferably of 300-5000 g/mol, especially preferably of 500-1000 g/mol, and a PO content of preferably 10%-100% by weight, preferably of 50%-100% by weight, and polyester monools or polyester polyols having a molecular weight preferably in the range from 200 to 4500 g/mol, glycols, alkoxylates, carbonates, ethers, esters, branched or linear aliphatic or aromatic hydrocarbons and/or oils of synthetic and/or natural origin, is a preferred embodiment of the invention.

The preparation of the polysiloxanes used in accordance with the invention is known per se. It can be effected, for example, as described in WO2009/035563, especially paragraphs [0021] and [0025] to [0028] therein. Reference is hereby made explicitly to WO2009/035563 and especially to its disclosure-content relating to the preparation of the polysiloxanes used in accordance with the invention. The polysiloxanes used in accordance with the invention can generally be prepared by a platinum-catalysed addition reaction of a siloxane containing a silane hydrogen atom with a linear polyoxyalkylene oxide polyether wherein the linear chain is blocked at one end by an alkyleneoxy group (such as allyloxy or vinyloxy) and bears a hydrogen atom or has been capped, for example, with an alkoxy, aralkyloxy or acyloxy group at the other end. Advantageously, bridging substances are used, which can likewise react in a platinum-catalysed addition reaction with a siloxane containing a silane hydrogen atom. These are notable in that they have at least two multiple bonds. Examples of these are hexa-1,5-diene, octa-1,7-diene, trimethylolpropane diallyl ether, trimethylolpropane triallyl ether, pentaerythrityl triallyl ether, divinylbenzene, divinylcyclohexane, butane-1,4-diol divinyl ether, diallyl ether, diallyl polyether, 1,3-divinyltetramethyldisiloxane, α,ω-divinylsiloxanes, diundecylenic esters, pentaerythritol tetraacrylate and trimethylolpropane triacrylate.

In a completely surprising manner, however, it has now been found in the context of this invention that the use of the inventive siloxanes of the formula (I) enables a particularly simple route to viscoelastic polyurethane foam, the specific polysiloxanes acting as cell openers.

The additives for use in accordance with the invention, namely the siloxanes of the formula (I), can be used either alone or in combination with conventional stabilizers. These may be both Si-containing and non-Si-containing, especially Si-containing and non-Si-containing organic stabilizers and surfactants. The Si-containing stabilizers can further be distinguished by whether the polyoxyalkylene block is bonded to the polysiloxane block by a hydrolytically stable C—Si bond or by the less hydrolytically stable C—O—Si bond. In a preferred embodiment of the invention, the inventive siloxanes of the formula (I) are used in combination with conventional stabilizers.

The inventive production of the polyurethane foam is typically effected in the presence of one or more catalysts which catalyse the isocyanate-polyol and/or isocyanate-water reactions and/or the isocyanate trimerization.

DETAILED DESCRIPTION OF THE INVENTION

The subject-matter of the invention is described in detail hereinafter with reference to advantageous embodiments. When ranges, general formulae or compound classes are specified herein below, these shall include not just the corresponding ranges or groups of compounds that are explicitly mentioned but also all sub-ranges and sub-groups of compounds which can be obtained by extracting individual values (ranges) or compounds. Where documents are cited in the context of the present description, it is intended that their content fully form part of the disclosure content of the present invention. Unless stated otherwise, percentages are figures in percent by weight. When mean values are reported hereinafter, the values in question are weight averages, unless stated otherwise. Unless stated otherwise, the molar mass of the compounds used was determined in accordance with DIN 55672-1:2007-8 by gel permeation chromatography (GPC), with calibration against a polypropylene glycol standard (76-6000 g/mol). The structure of the compounds used was determined by NMR methods, especially by $^{13}$C and $^{29}$Si NMR. Hydroxyl numbers can be determined by titrimetric means to DIN 53240-1:2012-07. Where chemical (empirical) formulae are used in the present invention, the reported indices can be not only absolute numbers but also average values. Indices relating to polymeric compounds are preferably averages. If measurements are reported hereinafter, these measurements, unless stated otherwise, have been conducted under standard conditions (25° C. and 1013 mbar).

In a particularly preferred embodiment, additives used in the production of PUR foam using at least one polyol component and at least one isocyanate component, where the polyol component used has an average hydroxyl number, determined to DIN 53240-1:2012-07, of >56 to <450 mg KOH/g, preferably of 57-300 mg KOH/g, and where the PUR foam is produced at an isocyanate index of 65 to 108, are siloxanes of the formula (I) $M_a M^1_b D_c D^1_d T_e Q_f G_g$ as already specified above, where d=1-40, preferably 1.2-30, especially 1.5-20. The statements made above apply to the other indices, parameters and structural elements of the formula (I).

In a further preferred embodiment, the following indices apply to the siloxanes of the formula (I):
a=2-8, especially 2.4-4.1,
b=0,
c=3-450, especially 10-250,
d=1-40, preferably 1.2-30, especially 1.5-20,
e=0,
f=0,
g=0.1-3, preferably 0.15-2, especially 0.2-1.5,
where a+b≥2 and N=a+b+c+d+e+f+g≥11 and ≤500, b+d≥1.
The statements made above apply to the other indices, parameters and structural elements of the formula (I).

When the siloxane of the formula (I) used overall, at least in a proportion of 5% by weight, has a molar mass of >50 000, preferably >60 000, based on the siloxane of the formula (I) used overall, this is a preferred embodiment of the invention.

Preferably, the PUR foam (especially viscoelastic PUR foam) can be produced by foaming a mixture comprising at least one urethane and/or isocyanurate catalyst, at least one blowing agent and/or water, at least one isocyanate component and a polyol mixture containing at least one polyol having a hydroxyl number of >100 mg KOH/g (preferably at least one trifunctional polyether alcohol having a hydroxyl number >100 mg KOH/g and essentially propylene oxide units in the chain) in the presence of the inventive siloxane of the formula (I), where the polyol component used overall has an average hydroxyl number, determined to DIN 53240-1:2012-07, of >56 to <450 mg KOH/g, preferably of 57-300 mg KOH/g, and where the PUR foam is produced at an isocyanate index of 65 to 108.

As well as the components already mentioned, the mixture may include further customary constituents, for example, optionally (further) blowing agents, optionally prepolymers, optionally flame retardants, and optionally further additives, for example fillers, emulsifiers which are preferably based on the reaction of hydroxy-functional compounds with isocyanate, stabilizers, for example, Si-containing and non-Si-containing, especially Si-containing and non-Si-containing organic stabilizers and surfactants, viscosity reducers, dyes, antioxidants, UV stabilizers or antistats.

Further details of usable starting materials, catalysts and auxiliaries and derivatives can be found, for example, in Kunststoff-Handbuch [Plastics Handbook], volume 7, Polyurethane [Polyurethanes], Carl-Hanser-Verlag Munich, 1st edition 1966, 2nd edition 1983 and 3rd edition 1993.

The total amount of siloxane of the formula (I) is preferably selected such that 0.001 to 10 parts by weight, especially 0.2 to 5 parts by weight, of the siloxane are used per 100 parts of the total amount of polyol used.

More particularly, it is preferable that the PUR foam is produced using reactive amine and/or amine having a molar mass >100 g/mol, preferably having a molar mass of >160 g/mol, as catalyst.

The compounds, components and additives which follow are mentioned merely by way of example and can be replaced by other substances known to those skilled in the art.

Further surfactants which can be used advantageously in the inventive production of polyurethane foams may be selected, for example, from the group comprising nonionic surfactants and/or amphoteric surfactants.

Surfactants used may, in accordance with the invention, for example, also be polymeric emulsifiers include polyalkyl polyoxyalkyl polyacrylates, polyvinylpyrrolidones or polyvinyl acetates. It is likewise possible to use, as surfactants/emulsifiers, prepolymers which are obtained by reaction of small amounts of isocyanates with polyols (called oligourethanes), and which are preferably dissolved in polyols.

Foam stabilizers used may preferably be those which are known from the prior art and which are typically also employed for polyurethane foam stabilization. These may be both Si-containing and non-Si-containing, especially Si-containing and non-Si-containing organic stabilizers and surfactants. The Si-containing stabilizers are further distinguished by whether the polyoxyalkylene block is bonded to the polysiloxane block by a hydrolytically stable C—Si bond (as, for example, in EP 2 182 020) or by the less hydrolytically stable C—O—Si bond. The SiC-polysiloxane-polyoxyalkylene block copolymers usable for polyurethane foam stabilization can be prepared, for example, by noble metal-catalysed hydrosilylation of unsaturated polyoxyalkylenes with SiH-functional siloxanes, called hydrosiloxanes, as described, for example, in EP 1 520 870. The hydrosilylation can be conducted batchwise or continuously, as described, for example, in DE 198 59 759 C1.

A multitude of further documents, for example EP 0 493 836 A1, U.S. Pat. No. 5,565,194 or EP 1 350 804, each disclose polysiloxane-polyoxyalkylene block copolymers of a specific composition for fulfillment of specific profiles of demands for foam stabilizers in various polyurethane foam formulations.

Biocides used may be commercial products such as chlorophene, benzisothiazolinone, hexahydro-1,3,5-tris(hydroxyethyl-s-triazine), chloromethylisothiazolinone, methylisothiazolinone or 1,6-dihydroxy-2,5-dioxohexane, which are known by the trade names BIT 10, Nipacide BCP, Acticide MBS, Nipacide BK, Nipacide CI, Nipacide FC.

Suitable flame retardants for the purposes of this invention are any substances considered suitable therefor in the prior art. Examples of preferred flame retardants are liquid organophosphorus compounds such as halogen-free organophosphates, e.g., triethyl phosphate (TEP), halogenated phosphates, e.g. tris(1-chloro-2-propyl)phosphate (TCPP), tris(1,3-dichloro-2-propyl)phosphate (TDCPP) and tris(2-chloroethyl)phosphate (TCEP), and organic phosphonates, e.g., dimethyl methanephosphonate (DMMP), dimethyl propanephosphonate (DMPP), or solids such as ammonium polyphosphate (APP) and red phosphorus. Suitable flame retardants further include halogenated compounds, for example, halogenated polyols, and also solids such as expandable graphite and melamine. All these flame retardants and combinations thereof can be utilized advantageously in the context of this invention; these also include all the commercially available flame retardants from Great Lakes Solutions (Chemtura) (e.g.: DP-54™, Firemaster® BZ-54 HP, Firemaster® 550, Firemaster® 552, Firemaster® 600, Firemaster® 602, Reofos® 50, Reofos® 65, Reofos® 95, Kronitex® CDP), ICL Industrial Products (e.g.: FR-513, FR-1210, FR-1410, Fyrol™ FR-2, Fyrol™ 38, Fyrol™ HF-5, Fyrol™ A300 TB, Fyrol™ PCF, Fyrol™ PNX, Fyrol™ PNX-LE), Clariant (e.g.: Exolit® OP 550 or Exolit® OP 560).

It is possible to mix all the components except for the polyols and isocyanates to give an activator solution prior to the foaming. In that case, the latter preferably comprises, inter alia, the siloxane of the formula (I) usable in accordance with the invention, stabilizers, catalysts, blowing agents, for example water, and any further additives, such as flame retardants, colours, biocides, etc., according to the formulation of the polyurethane foam. Such an activator solution also forms part of the subject-matter of the present invention.

The blowing agents are distinguished between chemical and physical blowing agents. The chemical blowing agents include, for example, water, the reaction of which with the isocyanate groups leads to formation of $CO_2$. The density of the foam can be controlled via the amount of water added, the preferred use amounts of water being between 0.5 and 10 parts, preferably between 1 and 7 parts, more preferably between 1 and 5 parts, based on 100.0 parts of polyol. In addition, it is alternatively and/or else additionally possible to use physical blowing agents. These are liquids which are inert to the formulation constituents and have boiling points below 100° C., preferably below 50° C., especially between −50° C. and 30° C., at atmospheric pressure, such that they evaporate under the influence of the exothermic polyaddition reaction. Examples of such liquids usable with preference are ketones such as acetone and/or methyl ethyl ketone, hydrocarbons such as n-, iso- or cyclopentane, n- or isobutane and propane, cyclohexane, ethers such as dimethyl ether and diethyl ether, halogenated hydrocarbons such as methylene chloride, tetrafluoroethane, pentafluoropropane, heptafluoropropane, pentafluorobutane, hexafluorobutane and/or dichloromonofluoroethane, trichlorofluoromethane, dichlorotetrafluoroethane and 1,1,2-trichloro-1,2,2-trifluoroethane. In addition, it is also possible to use carbon dioxide. It is also possible to use mixtures of these low-boiling liquids with one another and/or with other substituted or unsubstituted hydrocarbons. The foaming may proceed either under standard pressure or under reduced pressure (VPF technology).

The amount of the physical blowing agent usable with preference in the context of the present invention is preferably in the range between 0 and 50 parts by weight, especially 1 to 15 parts by weight, and the amount of water is preferably in the range between 0.5 and 10 parts by weight, especially 1 to 5 parts by weight, based in each case on 100 parts by weight of polyol. Carbon dioxide is preferred among the physical blowing agents, and is preferably used in combination with water as chemical blowing agent.

The inventive activator solution may additionally comprise all the customary additives known for activator solutions in the prior art. The additives may be selected from the group comprising flame retardants, antioxidants, UV stabilizers, dyes, biocides, pigments, cell openers, crosslinkers and the like.

An activator composition suitable for production of polyurethane foam, especially viscoelastic polyurethane foam, comprising polyol including at least one polyol having a hydroxyl number >100 mg KOH/g, siloxane of the formula (I), amine catalyst, optionally catalysts, excluding tin catalysts, where the total amount of polyol used has an average hydroxyl number, determined to DIN 53240-1:2012-07, of >56 to <450 mg KOH/g, preferably of 57-300 mg KOH/g, forms a further part of the subject-matter of the present invention. It is a particular benefit of the present invention that it enables the provision of particularly storage- and hydrolysis-stable activator compositions.

For production of a polyurethane foam (especially viscoelastic polyurethane foam), it is possible with preference in the context of the invention to convert a mixture of polyol containing at least one polyol having an OH number >100 mg KOH/g (preferably at least one trifunctional polyether alcohol having a hydroxyl number >100 mg KOH/g and essentially propylene oxide units in the chain), di- or polyfunctional isocyanate, inventive siloxane of the formula (I), amine catalyst, organopotassium, -zinc and/or -tin compound or other metallic catalysts, stabilizers, blowing agents, preferably water for formation of $CO_2$, and, if necessary, addition of physical blowing agents, optionally with addition of flame retardants, antioxidants, UV stabilizers, colour pastes, biocides, fillers, crosslinkers or other customary processing aids, where the polyol component used overall has an average hydroxyl number, determined to DIN 53240-1:2012-07, of >56 to <450 mg KOH/g, preferably of 57-300 mg KOH/g, and where the PUR foam is produced at an isocyanate index of 65 to 108. Such a mixture likewise forms part of the subject-matter of the invention. A mixture comprising the siloxane of the formula (I) for use in accordance with the invention and polyol, comprising polyol having an OH number >100 mg KOH/g (preferably at least one trifunctional polyether alcohol having a hydroxyl number >100 mg KOH/g and essentially propylene oxide units in the chain), likewise forms part of the subject-matter of the invention.

Isocyanates used may be organic isocyanate compounds containing at least two isocyanate groups. In general, useful isocyanates are the aliphatic, cycloaliphatic, arylaliphatic and preferably aromatic polyfunctional isocyanates known per se.

Specific examples include the following: alkylene diisocyanates having 4 to 12 carbon atoms in the alkylene radical, such as dodecane 1,12-diisocyanate, 2-ethyltetramethylene 1,4-diisocyanate, 2-methylpentamethylene 1,5-diisocyanate, tetramethylene 1,4-diisocyanate and preferably hexamethylene 1,6-diisocyanate, cycloaliphatic diisocyanates such as cyclohexane 1,3- and 1,4-diisocyanates and any desired mixtures of these isomers, 1-isocyanato-3,3,5-trimethyl-5-isocyanatomethylcyclohexane (IPDI), hexahydrotolylene 2,4- and 2,6-diisocyanate and the corresponding isomer mixtures, dicyclohexylmethane 4,4'-, 2,2'- and 2,4'-diisocyanate and the corresponding isomer mixtures, and preferably aromatic di- and polyisocyanates, for example tolylene 2,4- and 2,6-diisocyanate and the corresponding isomer mixtures, diphenylmethane 4,4'-, 2,4'- and 2,2'-diisocyanate and the corresponding isomer mixtures, mixtures of diphenylmethane 4,4'- and 2,2'-diisocyanates, polyphenylpolymethylene polyisocyanates, mixtures of diphenylmethane 4,4'-, 2,4'- and 2,2'-diisocyanates and polyphenylpolymethylene polyisocyanates (crude MDI) and mixtures of crude MDI and tolylene diisocyanates. The organic di- and polyisocyanates may be used individually or in the form of mixtures thereof.

It is also possible to use isocyanates which have been modified by the incorporation of urethane, uretdione, isocyanurate, allophanate and other groups, called modified isocyanates.

Organic polyisocyanates have been found to be particularly useful and are therefore employed with preference: tolylene diisocyanate, mixtures of diphenylmethane diisocyanate isomers, mixtures of diphenylmethane diisocyanate and polyphenylpolymethyl polyisocyanate or tolylene diisocyanate with diphenylmethane diisocyanate and/or polyphenylpolymethyl polyisocyanate or what are called prepolymers.

It is possible to use either TDI (tolylene 2,4- and 2,6-diisocyanate isomer mixture) or MDI (diphenylmethane 4,4'-diisocyanate). What is called "crude MDI" or "polymeric MDI" contains, as well as the 4,4' isomers, also the 2,4' and 2,2' isomers, and also higher polycyclic products. "Pure MDI" refers to bicyclic products composed predominantly of 2,4' and 4,4' isomer mixtures or prepolymers thereof. Further suitable isocyanates are detailed in patent specification EP 1095968, to which reference is made here in full.

When the inventive production of the PUR foam is effected using tolylene diisocyanate (TDI) and/or methylene diphenyl diisocyanate (MDI), preferably tolylene diisocyanate, especially with use of a mixture of 80% toluene 2,4-diisocyanate and 20% toluene 2,6-diisocyanate, this is a preferred embodiment of the invention.

Crosslinkers refer to low molecular weight polyfunctional compounds that are reactive toward isocyanates. Suitable examples are polyfunctional, especially di- and trifunctional compounds having molecular weights of 62 to 1000 g/mol, preferably 62 to 600 g/mol. Those used include, for example, di- and trialkanolamines such as diethanolamine and triethanolamine, aliphatic and aromatic diamines, for example ethylenediamine, butylenediamine, butylene-1,4-diamine, hexamethylene-1,6-diamine, 4,4'-diaminodiphenylmethane, 3,3'-dialkyl-substituted 4,4'-diaminodiphenylmethanes, tolylene-2,4- and -2,6-diamine, and preferably aliphatic diols and triols having 2 to 6 carbon atoms, such as ethylene glycol, propylene glycol, 1,4-butylene glycol, 1,6-hexamethylene glycol, 2-methylpropane-1,3-diol, glycerol and trimethylolpropane or castor oil or pentaerythritol, and also higher polyhydric alcohols such as sugar alcohols, for example, sucrose, glucose or sorbitol, and alkoxylated compounds of all the aforementioned examples.

The use concentration is typically between 0.1 and 5 parts, based on 100.0 parts polyol, according to the formulation, but may also differ therefrom. When MDI having a functionality f>2 is used in the mould foaming operation, it is likewise assumes a crosslinking function. The content of low molecular weight crosslinkers can therefore be reduced as the amount of corresponding MDI increases.

In principle, the present invention can be employed in all known processes for production of PUR foams. More particularly, the inventive siloxane of the formula (I) can be used in the slab foaming operation. It is possible to use all processes known to those skilled in the art for production of free-rise polyurethane foams. For example, the foaming operation can be effected either in the horizontal or in the vertical direction, in batchwise or continuous systems. The foaming can also be effected directly in moulds. It is likewise possible to utilize the siloxanes of the formula (I) usable in accordance with the invention for $CO_2$ technology. Use in low-pressure and high-pressure machines is possible, in which case the inventive siloxanes of the formula (I) or formulations comprising them can be metered directly into the mixing chamber or else added upstream of the mixing chamber to one of the components which subsequently passes into the mixing chamber. The addition can also be effected in the raw material tank.

For inventive production of the preferably viscoelastic polyurethane foams, it is advantageously possible to use polyol mixtures. In the context of the present application, polyols are especially understood to mean compounds having at least two hydrogen atoms reactive toward isocyanate groups, i.e. especially diols, triols, etc. Preferably, at least one polyol having a relatively high OH number (>100 mg KOH/g) is used in the production. The effect of such a polyol is that the density at network node points is increased and hence the glass transition temperature is raised. The glass transition temperature in the case of inventive viscoelastic foams is preferably between −20 and +15° C. The glass transition temperature of standard flexible polyurethane foams, in contrast, is regularly below −35° C. The mean glass transition temperature can be measured by means of dynamic mechanical analysis (DMA) (DIN 53513:1990-03) or by means of differential calorimetry (DSC) (ISO 11357-2:2013). Strictly speaking, it is a glass transition range which extends over a temperature range. As a result of the high glass transition temperature of the viscoelastic flexible foams, some network segments are still frozen, and of restricted mobility, in the polyurethane network at room temperature. This affects the elasticity of the overall polyurethane network, and causes time delay characteristics.

The OH number of a polyol is the weight of potassium hydroxide in mg which is required for hydrolysis of 1 g of the acetylated polyol derivative. The OH number is defined by the following equation:

$$OH\# = \frac{56.1 \times 1000 \times f}{MW}$$

with
OH#=OH number of the polyol
f=average functionality (average number of hydroxyl groups per polyol molecule)
MW=average molar mass of the polyol Polyols having an OH number >100 mg KOH/g are widely commercially available. All these polyols and combinations thereof can be utilized advantageously in the context of this invention, including all the corresponding polyols from BASF (e.g.: Elastoflex 5918/100), Bayer Material Science (e.g.: Desmophen PU 24WB03), PCC Rokita (for example ROKOPOL EP8262.03), Dow Chemical (for example Voranol 2070, Voranol CP 755, Voranol CP 3150, Voranol WK 3140, Voranol HT 760 or Voranol HAT 762), Huntsman (for example JEFFOL FX31-167 Polyol or JEFFOL FX31-240 Polyol) or Peterson Chemicals (for example SP168, SP170, SP238).

As well as the polyol having OH number >100 mg KOH/g, further polyol components present in the mixture may optionally be all the known polyol compounds.

These may, for example, be polyether polyols or polyester polyols which typically bear 2 to 6 OH groups per molecule and, as well as carbon, hydrogen and oxygen, may also contain heteroatoms such as nitrogen, phosphorus or halogens; preference is given to using polyether polyols. Polyols of this kind can be prepared by known processes, for example by anionic polymerization of alkylene oxides in the presence of alkali metal hydroxides or alkali metal alkoxides as catalysts, and with addition of at least one starter molecule containing 2 to 3 reactive hydrogen atoms in bound form, or by cationic polymerization of alkylene oxides in the presence of Lewis acids, for example, antimony pentachloride or boron fluoride etherate, or by double metal cyanide catalysis. Suitable alkylene oxides contain 2 to 4 carbon atoms in the alkylene radical. Examples are tetrahydrofuran, 1,2-propylene oxide, 1,2- or 2,3-butylene oxide; preference is given to using ethylene oxide and/or 1,2-propylene oxide. The alkylene oxides may be used individually, in alternation or as mixtures. H-functional starter substances used are especially polyfunctional alcohols and/or amines. Alcohols used with preference are dihydric alcohols, for example ethylene glycol, propylene glycol, or butanediols, trihydric alcohols, for example glycerol, trimethylolpropane or castor oil or pentaerythritol, and higher polyhydric alcohols, such as sugar alcohols, for example sucrose, glucose or sorbitol. Amines used with preference are aliphatic amines having up to 10 carbon atoms, for example, ethylenediamine, diethylenetriamine, propylenediamine, aromatic amines, for example, tolylenediamine or diaminodiphenylmethane, and also amino alcohols such as ethanolamine or diethanolamine.

Polyester polyols can be prepared by a polycondensation reaction or by ring-opening polymerization. Acid components used are, for example, succinic acid, maleic acid, maleic anhydride, adipic acid, phthalic anhydride, phthalic acid, isophthalic acid, terephthalic acid, tetrahydrophthalic acid, tetrahydrophthalic anhydride, hexahydrophthalic anhydride or mixtures of said acids and/or anhydrides. Alcohol components used are, for example, ethanediol, propane-1,2-diol, propane-1,3-diol, butane-1,4-diol, pentane-1,5-diol, neopentyl glycol, hexane-1,6-diol, 1,4-bis(hydroxymethyl)cyclohexane, diethylene glycol, dipropylene glycol, trimethylolpropane, glycerol, pentaerythritol or mixtures of the alcohols mentioned. If the alcohol component used is dihydric or polyhydric polyether polyols, the result is polyester ether polyols which can likewise serve as starter substances for preparation of the polyether polycarbonate polyols. Preference is given to using polyether polyols having Mn=150 to 2000 g/mol for preparation of the polyester ether polyols.

A further class of polyols is of those which are obtained as prepolymers by reaction of polyol with isocyanate in a molar ratio of 100:1 to 5:1, preferably 50:1 to 10:1. Such prepolymers are preferably used in the form of a solution in polyol, and the polyol preferably corresponds to the polyol used for preparing the prepolymers.

Yet a further class of polyols is that of the so-called filled polyols (polymer polyols). These contain dispersed solid organic fillers up to a solids content of 40% by weight or more. The following are among those which may be used:

SAN polyols: These are highly reactive polyols containing a dispersed copolymer based on styrene-acrylonitrile (SAN).

PHD polyols: These are highly reactive polyols containing polyurea, likewise in dispersed form.

PIPA polyols: These are highly reactive polyols containing a dispersed polyurethane, for example, formed by in situ reaction of an isocyanate with an alkanolamine in a conventional polyol.

The solids content, which is preferably between 5% and 40% by weight, based on the polyol, depending on the application, is responsible for improved cell opening, and so the polyol can be foamed in a controlled fashion, especially with TDI, and no shrinkage of the foams occurs. The solid thus acts as an essential processing aid. A further function is to control the hardness via the solids content, since higher solids contents bring about a higher hardness on the part of the foam.

The formulations with solids-containing polyols have distinctly lower intrinsic stability and therefore tend to require physical stabilization in addition to the chemical stabilization due to the crosslinking reaction.

Depending on the solids contents of the polyols, these are used alone or in a blend with the abovementioned unfilled polyols.

A further class of usable polyols is of the so-called autocatalytic polyols, especially autocatalytic polyether polyols. Polyols of this type are based, for example, on polyether blocks, preferably on ethylene oxide and/or propylene oxide blocks, and also contain catalytically active functional groups, for example, nitrogenous functional groups, in particular amino groups, preferably tertiary amine functions, urea groups and/or heterocycles comprising nitrogen atoms. Through the use of such autocatalytic polyols in the production of polyurethane systems, especially of polyurethane foams, preferably of flexible polyurethane foams, it is possible, as the case may be, to reduce the required amount of any catalysts used in addition, depending on application, and/or to match it to specific desired foam properties. Suitable polyols are described for example in WO0158976 (A1), WO2005063841 (A1), WO0222702 (A1), WO2006055396 (A1), WO03029320 (A1), WO0158976 (A1), U.S. Pat. No. 6,924,321 (B2), U.S. Pat. No. 6,762,274 (B2), EP2104696 (B1), WO2004060956 (A1) or WO2013102053 (A1) and are available from Dow under the trade names of Voractiv™ and/or SpecFlex™ Activ for example.

Polyol components present in the reaction mixture are preferably polyether polyols, more preferably polyoxypropylene polyoxyethylene polyols having a functionality (number of active hydrogen atoms, especially number of OH groups) of 2 to 8 and number-average molecular weights in the range from 500 to 8000, preferably 700 to 4500. Preferably, the polyol component includes at least one polyol having a relatively high OH number of >100 mg KOH/g, determinable to DIN 53240-1:2012-07. Further polyols are known to those skilled in the art and can be found, for example, in EP-A-0 380 993 or U.S. Pat. No. 3,346,557, which are fully incorporated herein by reference. The polyol component used overall has an average hydroxyl number, determined to DIN 53240-1:2012-07, of >56 to <450 mg KOH/g, preferably of 57-300 mg KOH/g.

Blowing agents used may be the known blowing agents. Preferably, in the production of the polyurethane foam, water, methylene chloride, pentane, alkanes, halogenated alkanes, acetone and/or carbon dioxide are used as blowing agents.

The water can be added directly to the mixture or else be added to the mixture as a secondary component of one of the reactants, for example of the polyol component, together with the latter.

In addition to physical blowing agents and any water, it is also possible to use other chemical blowing agents which react with isocyanates to evolve a gas, an example being formic acid.

Catalysts used in the context of this invention may, for example, be any catalysts for the isocyanate-polyol (urethane formation) and/or isocyanate-water (amine and carbon dioxide formation) and/or isocyanate dimerization (uretdione formation), isocyanate trimerization (isocyanurate formation), isocyanate-isocyanate with $CO_2$ elimination (carbodiimide formation) and/or isocyanate-amine (urea formation) reactions and/or "secondary" crosslinking reactions such as isocyanate-urethane (allophanate formation) and/or isocyanate-urea (biuret formation) and/or isocyanate-carbodiimide (uretonimine formation).

Suitable catalysts for the purposes of the present invention are, for example, substances which catalyse one or the aforementioned reactions, especially the gelling reaction (isocyanate-polyol), the blowing reaction (isocyanate-water) and/or the dimerization or trimerization of the isocyanate. Such catalysts are preferably nitrogen compounds, especially amines and ammonium salts, and/or metal compounds.

Suitable nitrogen compounds as catalysts, also referred to hereinafter as nitrogenous catalysts, for the purposes of the present invention are all nitrogen compounds according to the prior art which catalyse one of the abovementioned isocyanate reactions and/or can be used for production of polyurethanes, especially of polyurethane foams.

Examples of suitable nitrogen compounds as catalysts for the purposes of the present invention are preferably amines, especially tertiary amines or compounds containing one or more tertiary amine groups, including the amines triethylamine, N,N-dimethylcyclohexylamine, N,N-dicyclohexylmethylamine, N,N-dimethylaminoethylamine, N,N,N',N'-tetramethylethylene-1,2-diamine, N,N,N',N'-tetramethylpropylene-1,3-diamine, N,N,N',N'-tetramethyl-1,4-butanediamine, N,N,N',N'-tetramethyl-1,6-hexanediamine, N,N,N',N'',N''-pentamethyldiethylenetriamine, N,N,N'-trimethylaminoethylethanolamine, N,N-dimethylaminopropylamine, N,N-diethylaminopropylamine, N,N-dimethylaminopropyl-N',N'-dipropan-2-olamine, 2-[[3-(dimethylamino)propyl]methylamino]ethanol, 3-(2-dimethylamino)ethoxy)propylamine, N,N-bis[3-(dimethylamino)propyl]amine, N,N,N',N'',N''-pentamethyldipropylenetriamine, 1-[bis[3-(dimethylamino)propyl]amino]-2-propanol, N,N-bis[3-(dimethylamino)propyl]-N',N'-dimethylpropane-1,3-diamine, triethylenediamine, 1,4-diazabicyclo[2.2.2]octane-2-methanol, N,N'-dimethylpiperazine, 1,2-dimethylimidazole, N-(2-hydroxypropyl)imidazole, 1-isobutyl-2-methylimidazole, N-(3-aminopropyl)imidazole, N-methylimidazole, N-ethylmorpholine, N-methylmorpholine, 2,2,4-trimethyl-2-silamorpholine, N-ethyl-2,2-dimethyl-2-silamorpholine, N-(2-aminoethyl)morpholine, N-(2-hydroxyethyl)morpholine, 2,2'-dimorpholinodiethyl ether, N,N'-dimethylpiperazine, N-(2-hydroxyethyl)piperazine, N-(2-aminoethyl)piperazine, N,N-dimethylbenzylamine, N,N-dimethylaminoethanol, N,N-diethylaminoethanol, 3-dimethylamino-1-propanol, N,N-dimethylaminoethoxyethanol, N,N-diethylaminoethoxyethanol, bis(2-dimethylaminoethyl ether), N,N,N'-trimethyl-N-(2-hydroxyethyl)bis(2-aminoethyl) ether, N,N,N'-trimethyl-N-3'-aminopropyl(bisaminoethyl)ether, tris(dimethylaminopropyl)hexahydro-1,3,5-triazine, 1,8-diazabicyclo[5.4.0]undec-7-ene, 1,5-diazabicyclo[4.3.0]non-5-ene, 1,5,7-triazabicyclo[4.4.0]dec-5-ene, N-methyl-1,5,7-triazabicyclo[4.4.0]dec-5-ene, 1,4,6-triazabicyclo[3.3.0]oct-4-ene, 1,1,3,3-tetramethylguanidine, tert-butyl-1,1,3,3-tetramethylguanidine, guanidine, 3-dimethylaminopropylurea, 1,3-bis[3-(dimethylamino)propyl]urea, bis-N,N-(dimethylaminoethoxyethyl)isophoronedicarbamate, 3-dimethylamino-N,N-dimethylpropionamide and 2,4,6-tris(dimethylaminomethyl)phenol. Suitable nitrogenous catalysts according to the prior art can be purchased, for example, from Evonik under the TEGOAMIN® trade name.

According to the application, it may be preferable that, in the inventive production of (preferably viscoelastic) polyurethane foams, quaternized and/or protonated nitrogenous catalysts, especially quaternized and/or protonated tertiary amines, are used.

For possible quaternization of nitrogenous catalysts, it is possible to use any reagents known as quaternizing reagents. Preferably, quaternizing agents used are alkylating agents, for example dimethyl sulphate, methyl chloride or benzyl chloride, preferably methylating agents such as dimethyl sulphate in particular. Quaternization is likewise possible with alkylene oxides, for example ethylene oxide, propylene oxide or butylene oxide, preferably with subsequent neutralization with inorganic or organic acids.

Nitrogenous catalysts, if quaternized, may be singly or multiply quaternized. Preferably, the nitrogenous catalysts are only singly quaternized. In the case of single quaternization, the nitrogenous catalysts are preferably quaternized on a tertiary nitrogen atom.

Nitrogenous catalysts can be converted to the corresponding protonated compounds by reaction with organic or inorganic acids. These protonated compounds may be preferred, for example, when, for example, a slowed polyurethane reaction is to be achieved, or when the reaction mixture on application is to have improved flow characteristics.

Organic acids used may, for example, be all the organic acids mentioned hereinafter, for example carboxylic acids having 1 to 36 carbon atoms (aromatic or aliphatic, linear or branched), for example formic acid, lactic acid, 2-ethylhexanoic acid, salicylic acid and neodecanoic acid, or else polymeric acids, for example polyacrylic or polymethacrylic acids. Inorganic acids used may, for example, be phosphorus-based acids, sulphur-based acids or boron-based acids.

However, the use of nitrogenous catalysts which have not been quaternized or protonated is particularly preferred in the context of this invention.

Suitable metal compounds as catalysts, also referred to hereinafter as metallic catalysts, for the purposes of the present invention are all metal compounds according to the prior art which catalyse one of the abovementioned isocyanate reactions and/or can be used for production of polyurethanes, especially of polyurethane foams. The metal compounds may be selected, for example, from the group of the metal-organic or organometallic compounds, metal-organic or organometallic salts, organic metal salts, inorganic metal salts, and from the group of the charged or uncharged metallic coordination compounds, especially the metal chelate complexes.

The expression "metal-organic or organometallic compounds" in the context of this invention especially encompasses the use of metal compounds having a direct carbon-metal bond, also referred to here as metal organyls (e.g. tin organyls) or organometallic compounds (e.g., organotin compounds). The expression "organometallic or metal-organic salts" in the context of this invention especially encompasses the use of metal-organic or organometallic compounds having salt character, i.e., ionic compounds in which either the anion or cation is organometallic in nature (e.g., organotin oxides, organotin chlorides or organotin carboxylates). The expression "organic metal salts" in the context of this invention especially encompasses the use of metal compounds which do not have any direct carbon-metal bond and are simultaneously metal salts, in which either the anion or the cation is an organic compound (e.g., tin(II) carboxylates). The expression "inorganic metal salts" in the context of this invention especially encompasses the use of metal compounds or of metal salts in which neither the anion nor the cation is an organic compound, e.g., metal chlorides (e.g., tin(II) chloride), pure metal oxides (e.g., tin oxides) or mixed metal oxides, i.e., containing a plurality of metals, and/or metal silicates or aluminosilicates. The expression "coordination compound" in the context of this invention especially encompasses the use of metal compounds formed from one or more central particles and one or more ligands, the central particles being charged or uncharged metals (e.g. metal- or tin-amine complexes). The expression "metal-chelate complexes" in the context of this invention especially encompasses the use of metallic coordination compounds having ligands having at least two coordination or bonding sites to the metal centre (e.g., metal- or tin-polyamine or metal- or tin-polyether complexes).

Suitable metal compounds, especially as defined above, as additional catalysts for the purposes of the present invention may, for example, be selected from all metal compounds containing lithium, sodium, potassium, magnesium, calcium, scandium, yttrium, titanium, zirconium, vanadium, niobium, chromium, molybdenum, tungsten, manganese, cobalt, nickel, copper, zinc, mercury, aluminium, gallium, indium, germanium, tin, lead and/or bismuth, especially sodium, potassium, magnesium, calcium, titanium, zirconium, molybdenum, tungsten, zinc, aluminium, tin and/or bismuth, more preferably tin, bismuth, zinc and/or calcium.

Suitable organometallic salts and organic metal salts, as defined above, as catalysts for the purposes of the present invention are, for example, organotin, tin, zinc, bismuth and potassium salts, in particular corresponding metal carboxylates, alkoxides, thiolates and mercaptoacetates, for example, dibutyltin diacetate, dimethyltin dilaurate, dibutyltin dilaurate (DBTDL), dioctyltin dilaurate (DOTDL), dimethyltin dineodecanoate, dibutyltin dineodecanoate, dioctyltin dineodecanoate, dibutyltin dioleate, dibutyltin bis(n-lauryl mercaptide), dimethyltin bis(n-lauryl mercaptide), monomethyltin tris(2-ethylhexyl mercaptoacetate), dimethyltin bis(2-ethylhexyl mercaptoacetate), dibutyltin bis(2-ethylhexyl mercaptoacetate), dioctyltin bis(isooctyl mercaptoacetate), tin(II) acetate, tin(II) 2-ethylhexanoate (tin(II) octoate), tin(II) isononanoate, tin(II) 3,5,5-trimethylhexanoate), tin(II) neodecanoate, tin(II) ricinoleate, tin(II) oleate, zinc(II) acetate, zinc(II) 2-ethylhexanoate (zinc(II) octoate), zinc(II) isononanoate (zinc(II) 3,5,5-trimethylhexanoate), zinc(II) neodecanoate, zinc(II) ricinoleate, bismuth acetate, bismuth 2-ethylhexanoate, bismuth octoate, bismuth isononanoate, bismuth neodecanoate, potassium formate, potassium acetate, potassium 2-ethylhexanoate (potassium octoate), potassium isononanoate, potassium neodecanoate and/or potassium ricinoleate.

In the inventive production of (preferably viscoelastic) polyurethane foams, it may be preferable to rule out the use of organometallic salts, for example of dibutyltin dilaurate.

Suitable additional metallic catalysts are generally and preferably selected such that they do not have any troublesome intrinsic odour and are essentially toxicologically safe, and such that the resulting polyurethane systems, especially polyurethane foams, have a minimum level of catalyst-related emissions.

In the inventive production of preferably viscoelastic polyurethane foams, it may be preferable, according to the application, to use incorporable/reactive or high molecular weight catalysts. Catalysts of this kind may be selected, for example, from the group of the metal compounds, preferably from the group of the tin, zinc, bismuth and/or potassium compounds, especially from the group of the metal carboxylates of the aforementioned metals, for example, the tin, zinc, bismuth and/or potassium salts of isononanoic acid, neodecanoic acid, ricinoleic acid and/or oleic acid, and/or from the group of the nitrogen compounds, especially from the group of the low-emission amines and/or the low-emission compounds containing one or more tertiary amine groups, for example, described by the amines dimethylaminoethanol, N,N-dimethyl-N',N'-di(2-hydroxypropyl)-1,3-diaminopropane, N,N-dimethylaminopropylamine, N,N,N'-trimethyl-N'-hydroxyethylbis(aminoethyl) ether, 6-dimethylaminoethyl-1-hexanol, N-(2-hydroxypropyl)imidazole, N-(3-aminopropyl)imidazole, aminopropyl-2-methylimidazole, N,N,N'-trimethylaminoethanolamine, 2-(2-(N,N-dimethylaminoethoxy)ethanol, N-(dimethyl-3-aminopropyl)urea derivatives and alkylaminooxamides, such as bis(N—(N',N'-dimethylaminopropyl))oxamide, bis(N—(N',N'-dimethylaminoethyl))oxamide, bis(N—(N',N'-lmidazolidinylpropyl)oxamide, bis(N—(N',N'-diethylaminoethyl))oxamide, bis(N—(N',N'-diethylaminopropyl) oxamide, bis(N—(N',N'-diethylaminoethyl)oxamide, bis (N—(N',N'-diethylimino-1-methylpropyl)oxamide, bis(N-(3-morpholinopropylyl)oxamide, and the reaction products thereof with alkylene oxides, preferably having a molar mass in the range between 160 and 500 g/mol, and compounds of the general formula:

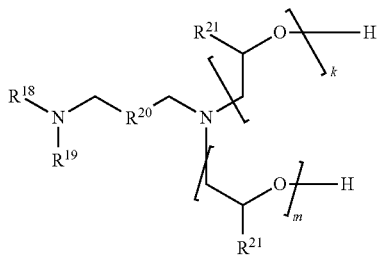

with
$R^{18}$, $R^{19}=C_aH_{2a+i}$ with a=1-4 for acyclic groups,
$R^{18}$, $R^{19}$=—$C_bH_cN_d$— with b=3-7, c=6-14, d=0-2 for cyclic groups,
$R^{20}=C_eH_fO_g$ with e=0-4, f=0-8, g=0-2,
$R^{21}$=—H, —$CH_3$, —$C_2H_5$,
k, m=identically or differently 1-5.

Catalysts and/or mixtures of this kind are supplied commercially, for example, under the Jeffcat® ZF-10, Lupragen® DMEA, Lupragen® API, Toyocat® RX 20 and Toyocat® RX 21, DABCO® RP 202, DABCO® RP 204, DABCO® NE 300, DABCO® NE 310, DABCO® NE 400, DABCO® NE 500, DABCO® NE 600, DABCO® NE 1060 and DABCO® NE 2039, Niax® EF 860, Niax® EF 890, Niax® EF 700, Niax® EF 705, Niax® EF 708, Niax® EF 600, Niax® EF 602, Kosmos® 54, Kosmos® EF, and Tegoamin® ZE 1 names.

Suitable use amounts of catalysts are guided by the type of catalyst and are preferably in the range from 0.005 to 10.0 pphp, more preferably in the range from 0.01 to 5.00 pphp (=parts by weight based on 100 parts by weight of polyol) or 0.10 to 10.0 pphp for potassium salts.

According to the application, it may be preferable that, in the inventive production of preferably viscoelastic polyurethane foams, one or more nitrogenous and/or metallic catalysts are used. When more than one catalyst is used, the catalysts may be used in any desired mixtures with one another. It is possible here to use the catalysts individually during the foaming operation, for example in the manner of a preliminary dosage in the mixing head, and/or in the form of a premixed catalyst combination.

The expression "premixed catalyst combination", also referred to hereinafter as catalyst combination, for the purposes of this invention especially encompasses ready-made mixtures of metallic catalysts and/or nitrogenous catalysts and/or corresponding protonated and/or quaternized nitrogenous catalysts, and optionally also further ingredients or additives, for example, water, organic solvents, acids for blocking the amines, emulsifiers, surfactants, blowing agents, antioxidants, flame retardants, stabilizers and/or siloxanes, preferably polyether siloxanes, which are already present as such prior to the foaming and need not be added as individual components during the foaming operation.

According to the application, it may be preferable when the sum total of all the nitrogenous catalysts used relative to the sum total of the metallic catalysts, especially potassium, zinc and/or tin catalysts, results in a molar ratio of 1:0.05 to 0.05:1, preferably 1:0.07 to 0.07:1 and more preferably 1:0.1 to 0.1:1.

In order to prevent any reaction of the components with one another, especially reaction of nitrogenous catalysts with metallic catalysts, especially potassium, zinc and/or tin catalysts, it may be preferable to store these components separately from one another and then to feed in the isocyanate and polyol reaction mixture simultaneously or successively.

The present invention further provides a process for producing polyurethane foam, especially viscoelastic polyurethane foam, by reacting at least one polyol component with at least one isocyanate component in the presence of one or more catalysts which catalyse the isocyanate-polyol and/or isocyanate-water reactions and/or isocyanate trimerization, wherein the reaction is conducted in the presence of a siloxane of the formula (I), where the polyol component used has an average hydroxyl number, determined to DIN 53240-1:2012-07, of >56 to <450 mg KOH/g, preferably of 57-300 mg KOH/g, and where the PUR foam is produced at an isocyanate index of 65 to 108. For preferred embodiments of the process according to the invention, reference is made explicitly to the preceding description. The preferred embodiments specified in that context apply analogously to the process just mentioned for production of polyurethane foam.

By means of the process according to the invention, a (flexible) polyurethane foam (especially a viscoelastic (flexible) polyurethane foam) is obtainable. This polyurethane foam forms a further part of the subject-matter of the invention. It is a particular feature of the polyurethane foam in question that the cell opener used for the production is based on interrupted siloxane block polymers, corresponding to the siloxanes of the formula (I).

Preferred polyurethane foams obtainable in accordance with the invention are those in which two or more of the preferred parameters mentioned further up (rebound resilience, density, pore structure, compressive stress, cell structure), preferably all the above mentioned parameters, are fulfilled.

The invention further provides a composition suitable for production of polyurethane foam, especially viscoelastic polyurethane foam, comprising polyol including at least one polyol having a hydroxyl number >100 mg KOH/g, di- or polyfunctional isocyanate, siloxane of the formula (I), amine catalyst, metallic catalysts such as preferably organopotassium, -zinc and/or -tin compounds, stabilizer, blowing agent, such as preferably water, optionally auxiliaries, such as preferably physical blowing agents, flame retardants, antioxidants, UV stabilizers, colour pastes, biocides, fillers and/or crosslinkers, where the polyol present overall has an average hydroxyl number, determined to DIN 53240-1: 2012-07, of >56 to <450 mg KOH/g, preferably of 57-300 mg KOH/g. Such a composition enables simple access to the polyurethane foam desired in accordance with the invention.

A preferred composition comprises polyol in amounts of 25% to 80% by weight, water in amounts of 1% to 5% by weight, catalyst in amounts of 0.01% to 1% by weight, physical blowing agent in amounts of 0% to 50% by weight, stabilizers such as preferably Si-containing and non-Si-containing, especially Si-containing and non-Si-containing organic stabilizers and surfactants, in amounts of up to 5% by weight, for example 0.001% to 5% by weight, isocyanate in amounts of 20% to 60% by weight, and siloxane of the formula (I) in amounts of 0.001% to 10% by weight, preferably 0.1% to 5% by weight.

For further preferred embodiments of the composition just mentioned, reference is made explicitly to the preceding description. The preferred embodiments specified in that context apply analogously to the composition just mentioned.

With the inventive polyurethane foam, it is possible to obtain articles including or consisting of this polyurethane foam. These articles form a further part of the subject-matter of this invention. Articles of this kind may, for example, be furniture cushioning or mattresses.

This invention further provides, in addition, a (preferably viscoelastic) polyurethane foam including the reaction products of one or more polyol components with one or more isocyanate components, with a siloxane of the formula (I) as described specifically above functioning as cell opener.

The invention further provides for the use of the inventive polyurethane foam as packaging foam, mattress, furniture cushioning, material in motor vehicle interiors, automobile seat cushioning, headrest, automobile interior trim, sound absorption material, shoe soles, carpet backing foam, filter foam, or for production of corresponding products, especially as material in motor vehicle interiors. Particular preference is given to use as a mattress, furniture cushioning, material in motor vehicle interiors, automobile seat cushioning, headrest, sound absorption material, or for production of corresponding products, especially as material in motor vehicle interiors.

The invention further provides for the use of siloxane of the formula (I) for production of (preferably viscoelastic) polyurethane foam with reduced emissions, and for production of low-odour (preferably viscoelastic) polyurethane foam, and for prevention of shrinkage in the production of (preferably viscoelastic) polyurethane foam, and for production of (preferably viscoelastic) polyurethane foam having particularly fine cell structure, and for production of (preferably viscoelastic) polyurethane foams having improved fire properties. For the aforementioned subject-matter too, with regard to preferred configurations, reference is made to the preceding description.

The subject-matter of the present invention is elucidated in detail hereinafter with reference to examples, without any intention that the subject-matter of the invention be restricted to these illustrative embodiments.

EXAMPLES

Preparation of the Inventive Additives

Example 1 (Inventive)

A 1 l three-neck flask having a jacketed coil condenser and precision glass stirrer was initially charged with 200 g of a siloxane of the general formula $Me_3SiO[SiMe_2O]_{91}[SiHMeO]_7SiMe_3$ together with 346 g of a polyether of the general formula $CH_2=CHCH_2O[CH_2CH_2O]_{14}[CH_2CH(CH_3)O]_{14}H$, 1.1 g of octa-1,7-diene and 234 g of toluene. The mixture was heated to 90° C., and 0.39 g of a 2% solution of the Karstedt catalyst in toluene was added. An exothermic reaction set in. The reaction mixture was then stirred at 90° C. for four hours. After this reaction time, the SiH functions had been fully converted. Thereafter, the toluene was removed by distillation on a rotary evaporator, and 547 g of a polyether of the general formula $C_4H_9O[CH_2CH_2O]_8[CH_2CH(CH_3)O]_8H$ were stirred in.

Example 2 (Inventive)

A 1 l three-neck flask having a jacketed coil condenser and precision glass stirrer was initially charged with 200 g of a siloxane of the general formula $Me_3SiO[SiMe_2O]_{91}[SiHMeO]_7SiMe_3$ together with 349 g of a polyether of the general formula $CH_2=CHCH_2O[CH_2CH_2O]_{14}[CH_2CH(CH_3)O]_{14}CH_3$, 1.1 g of octa-1,7-diene and 234 g of toluene. The mixture was heated to 90° C., and 0.39 g of a 2% solution of the Karstedt catalyst in toluene was added. An exothermic reaction set in. The reaction mixture was then stirred at 90° C. for four hours. After this reaction time, the SiH functions had been fully converted. Thereafter, the toluene was removed by distillation on a rotary evaporator, and 548 g of a polyether of the general formula $C_4H_9O[CH_2CH_2O]_8[CH_2CH(CH_3)O]_8H$ were stirred in.

Example 3 (Inventive)

A 1 l three-neck flask having a jacketed coil condenser and precision glass stirrer was initially charged with 200 g of a siloxane of the general formula $Me_3SiO[SiMe_2O]_{91}[SiHMeO]_7SiMe_3$ together with 230 g of a polyether of the general formula $CH_2=CHCH_2O[CH_2CH_2O]_{14}[CH_2CH(CH_3)O]_{14}H$, 95 g of a polyether of the general formula $CH_2=CHCH_2O[CH_2CH_2O]_8[CH_2CH(CH_3)O]_{14}H$, 1.1 g of octa-1,7-diene and 225 g of toluene. The mixture was heated to 90° C., and 0.39 g of a 2% solution of the Karstedt catalyst in toluene was added. An exothermic reaction set in. The reaction mixture was then stirred at 90° C. for four hours. After this reaction time, the SiH functions had been fully converted. Thereafter, the toluene was removed by distillation on a rotary evaporator, and 526 g of a polyether of the general formula $C_4H_9O[CH_2CH_2O]_8[CH_2CH(CH_3)O]_8H$ were stirred in.

Example 4 (Inventive)

A 1 l three-neck flask having a jacketed coil condenser and precision glass stirrer was initially charged with 200 g of a siloxane of the general formula $Me_2SiHO[SiMe_2O]_{83}[SiHMeO]_5SiHMe_2$ together with 256 g of a polyether of the general formula $CH_2=CHCH_2O[CH_2CH_2O]_{14}[CH_2CH(CH_3)O]_{14}H$, 105 g of a polyether of the general formula $CH_2=CHCH_2O[CH_2CH_2O]_8[CH_2CH(CH_3)O]_{14}H$, 1.2 g of octa-1,7-diene and 241 g of toluene. The mixture was heated to 90° C., and 0.40 g of a 2% solution of the Karstedt catalyst in toluene was added. An exothermic reaction set in. The reaction mixture was then stirred at 90° C. for four hours. After this reaction time, the SiH functions had been fully converted. Thereafter, the toluene was removed by distillation on a rotary evaporator, and 562 g of a polyether of the general formula $C_4H_9O[CH_2CH_2O]_8[CH_2CH(CH_3)O]_8H$ were stirred in.

Example 5 (Inventive)

A 2 l three-neck flask having a jacketed coil condenser and precision glass stirrer was initially charged with 200 g of a siloxane of the general formula $Me_3SiO[SiMe_2O]_{60}[SiHMeO]_5SiMe_3$ together with 359.7 g of a polyether of the general formula $CH_2=CHCH_2O[CH_2CH_2O]_{14}[CH_2CH(CH_3)O]_{14}H$, 2.9 g of 1,3-divinyltetramethyldisiloxane and 563 g of toluene. The mixture was heated to 90° C., and 0.56 g of a 2% solution of the Karstedt catalyst in toluene was added. An exothermic reaction set in. The reaction mixture was then stirred at 90° C. for four hours. After this reaction time, the SiH functions had been fully converted.

Example 6 (Inventive)

A 1 l three-neck flask having a jacketed coil condenser and precision glass stirrer was initially charged with 200 g of a siloxane of the general formula $Me_3SiO[SiMe_2O]_{91}$ $[SiHMeO]_7SiMe_3$ together with 346 g of a polyether of the general formula $CH_2=CHCH_2O[CH_2CH_2O]_{14}[CH_2CH(CH_3)O]_{14}H$, 2.2 g of $CH_2=CHCH_2O[CH_2CH_2O]_3CH_2CH=CH_2$ and 235 g of toluene. The mixture was heated to 90° C., and 0.39 g of a 2% solution of the Karstedt catalyst in toluene was added. An exothermic reaction set in. The reaction mixture was then stirred at 90° C. for four hours. After this reaction time, the SiH functions had been fully converted. Thereafter, the toluene was removed by distillation on a rotary evaporator, and 548 g of a polyether of the general formula $C_4H_9O[CH_2CH_2O]_8[CH_2CH(CH_3)O]_8H$ were stirred in.

Example 7 (Non-Inventive)

A 1 l three-neck flask having a jacketed coil condenser and precision glass stirrer was initially charged with 200 g of a siloxane of the general formula $Me_3SiO[SiMe_2O]_{91}$ $[SiHMeO]_7SiMe_3$ together with 384 g of a polyether of the general formula $CH_2=CHCH_2O[CH_2CH_2O]_{14}[CH_2CH(CH_3)O]_{14}H$ and 250 g of toluene. The mixture was heated to 90° C., and 0.42 g of a 2% solution of the Karstedt catalyst in toluene was added. An exothermic reaction set in. The reaction mixture was then stirred at 90° C. for four hours. After this reaction time, the SiH functions had been fully converted. Thereafter, the toluene was removed by distillation on a rotary evaporator, and 586 g of a polyether of the general formula $C_4H_9O[CH_2CH_2O]_8[CH_2CH(CH_3)O]_8H$ were stirred in.

Production of the Polyurethane Foams

In the performance tests, four typical formulations for viscoelastic polyurethane foams were used, and were of the following compositions:

TABLE 1

Formulation I for viscoelastic TDI80 flexible slabstock foam applications

| Formulation I | Parts by mass (pphp) |
| --- | --- |
| Voranol ® CP 755[1] | 70 |
| Voranol ® CP 3322[2] | 30 |
| Voranol ® CP 142[3] | 7 |
| Desmodur ® T 80[4] Index <85> | 40.3 |
| Water | 1.95 |
| TEGOAMIN ® 33[5] | 0.3 |
| TEGOAMIN ® BDE[5] | 0.2 |
| TEGOAMIN ® DMEA[5] | 0.2 |
| KOSMOS ® 29[6] | 0.07 |
| TEGOSTAB ® 2470[7] | 1.0 |
| Additive[8] | variable |

[1] available from Dow Chemical; this is a glycerol-based polyether polyol having an OH number of 235 mg KOH/g.
[2] available from Dow Chemical; this is a glycerol-based polyether polyol having an OH number of 48 mg KOH/g.
[3] available from Dow Chemical; this is a polyether polyol having an OH number of 33 mg KOH/g.
[4] tolylene diisocyanate T 80 (80% 2,4 isomer, 20% 2,6 isomer) from Bayer Material-Science, 3 mPa · s, 48% NCO, functionality 2.
[5] amine catalyst from Evonik Industries AG.
[6] tin catalyst, available from Evonik Industries AG: tin(II) salt of 2-ethylhexanoic acid.
[7] polyether-modified polysiloxane, available from Evonik Industries AG.
[8] Cell openers used are the inventive additives described in Examples 1-6, the non-inventive additive described in Example 7, and Niax ® L626 and Niax ® L627 from Momentive Performance Materials.

TABLE 2

Formulation II for viscoelastic TDI80 flexible slabstock foam applications

| Formulation II | Parts by mass (pphp) |
| --- | --- |
| Voralux ® HT 762[9] | 90 |
| Voranol ® CP 1421[3] | 10 |
| Desmodur ® T 80[4] Index <90> | 39.1 |
| Water | 1.5 |
| TEGOAMIN ® 33[5] | 0.3 |
| TEGOAMIN ® BDE[5] | 0.15 |
| KOSMOS ® 29[6] | 0.04 |
| TEGOSTAB ® BF 2470[7] | 0.5 |
| Additive[8] | variable |

[3] available from Dow Chemical; this is a polyether polyol having an OH number of 33 mg KOH/g.
[4] tolylene diisocyanate T 80 (80% 2,4 isomer, 20% 2,6 isomer) from Bayer Material-Science, 3 mPa · s, 48% NCO, functionality 2.
[5] amine catalyst from Evonik Industries AG.
[6] KOSMOS ® 29, available from Evonik Industries AG: tin(II) salt of 2-ethylhexanoic acid.
[7] polyether-modified polysiloxane, available from Evonik Industries AG.
[8] Cell openers used are the inventive additives described in Examples 1-6, the non-inventive additive described in Example 7, and Niax ® L626 and Niax ® L627 from Momentive Performance Materials.
[9] available from Dow Chemical; this is a glycerol-based polyether polyol having an OH number of 201 mg KOH/g.

TABLE 3

Formulation III for viscoelastic TDI80 flexible slabstock foam applications

| Formulation III | Parts by mass (pphp) |
| --- | --- |
| Rokopol ® EP8262.03[10] | 92 |
| Rokopol ® M1170[11] | 8 |
| Desmodur ® T 80[4] Index <93> | 41.8 |
| Water | 1.3 |
| TEGOAMIN ® 33[5] | 0.3 |
| TEGOAMIN ® BDE[5] | 0.15 |
| KOSMOS ® 29[6] | 0.03 |
| Ortegol ® 204[12] | 1.6 |
| TEGOSTAB ® BF 2470[7] | 0.5 |
| Additive[8] | variable |

[4] tolylene diisocyanate T 80 (80% 2,4 isomer, 20% 2,6 isomer) from Bayer Material-Science, 3 mPa · s, 48% NCO, functionality 2.
[5] amine catalyst from Evonik Industries AG.
[6] KOSMOS ® 29, available from Evonik Industries AG: tin(II) salt of 2-ethylhexanoic acid.
[7] polyether-modified polysiloxane, available from Evonik Industries AG.
[8] Cell openers used are the inventive additives described in Examples 1-6, the non-inventive additive described in Example 7, and Niax ® L626 and Niax ® L627 from Momentive Performance Materials.
[10] available from PCC SE; this is a polyether polyol having an OH number of 185 mg KOH/g.
[11] available from PCC SE; this is a glycerol-based polyether polyol having an OH number of 34 mg KOH/g.
[12] crosslinker, available from Evonik Industries AG.

TABLE 4

Formulation IV for viscoelastic MDI flexible slabstock foam applications

| Formulation IV | Parts by mass (pphp) |
| --- | --- |
| Desmophen ® 24WB03[13] | 70 |
| Desmophen ® 41WB01[14] | 30 |
| Voranat ™ M229 MDI[15] Index <81> | 60.5 |
| Water | 2.5 |
| TEGOAMIN ® 33[5] | 0.25 |
| TEGOAMIN ® BDE[5] | 0.2 |

TABLE 4-continued

Formulation IV for viscoelastic MDI flexible slabstock foam applications

| Formulation IV | Parts by mass (pphp) |
|---|---|
| KOSMOS ® 29[6] | 0.1 |
| Benzyl alcohol | 5 |
| TEGOSTAB ® B 8110[7] | 1.0 |
| Additive[8] | variable |

[5]amine catalyst from Evonik Industries AG.
[6]KOSMOS ® 29, available from Evonik Industries: tin(II) salt of 2-ethylhexanoic acid.
[7]polyether-modified polysiloxane, available from Evonik Industries AG.
[8]Cell openers used are the inventive additives described in Examples 1-6, the non-inventive additive described in Example 7, and Niax ® L626 and Niax ® L627 from Momentive Performance Materials.
[13]available from Bayer MaterialScience; this is a polyether polyol having an OH number of 165 mg KOH/g.
[14]available from Bayer MaterialScience; this is a glycerol-based polyether polyol having an OH number of 36 mg KOH/g.
[15]polymeric MDI from DOW Chemical, 190 mPa · s, 31.1% NCO, functionality 2.7.

General Procedure for Production of the Foams

The foams were produced at 22° C. and air pressure 753 mm Hg according to the details which follow. For production of each of the polyurethane foams, 250 g of polyol were used; the other formulation constituents were adjusted correspondingly. In this context, for example, 1.0 part (1.0 pphp) of a component means 1 g of this substance per 100 g of polyol.

A paper cup was charged with the tin catalyst tin(II) 2 ethylhexanoate, the three polyols, the water, the amine catalysts and the particular additive, and the contents were mixed with a disc stirrer at 1000 rpm for 60 seconds (s).

Then the isocyanate was added and incorporated using the same stirrer at 1500 rpm for 7 s. In the course of this, the mixture in the cup started to foam. Consequently, directly after the end of stirring, it was poured into a foaming box. This has a base area of 17×17 cm and a height of 30 cm. On the outside, a PUR foam insulation of thickness 5 cm prevented excessively rapid cooling. On the inside, the box was lined with a plastic film in order to subsequently be able to remove the cured foam. After being poured in, the foam rose up in the foaming box. In the ideal case, the foam blew off on attainment of the maximum rise height and then fell back slightly. At this time, the cell membranes of the foam bubbles opened, and an open-pore cell structure of the foam was obtained. In the case that foam stabilization was too small, the PUR foam collapsed before attaining the maximum rise height. In the case that stabilization was too great, the foam rose for a very long period and did not blow off. As a result of the cell structure being very closed in that case, the foam shrank in the course of subsequent cooling as a result of the contraction in volume of the cooling gas.

Performance Tests

The foams produced were assessed on the basis of the following physical properties:

a) Foam settling after the end of the rise phase (=fall-back):

The fall-back, or the further rise, is found from the difference in the foam height after direct blow-off and after 3 minutes after foam blow-off. The foam height is measured at the maximum in the middle of the foam crest by means of a needle secured to a centimeter scale. A negative value here describes the settling of the foam after the blow-off, while a positive value correspondingly describes the post-rise of the foam.

b) Foam height is the height of the freely risen foam formed after 3 minutes. Foam height is reported in centimeters (cm).

c) Rise time

The period of time between the end of mixing of the reaction components and the blow-off of the polyurethane foam.

d) Density

The determination is effected as described in DIN EN ISO 845:2009-10 by measuring the apparent density. Density is reported in kg/m$^3$.

e) Porosity

The permeability of the foam was determined in accordance with DIN EN ISO 4638:1993-07 by a dynamic pressure measurement on the foam. The dynamic pressure measured was reported in mm water column, with the lower dynamic pressure values then characterizing the more open foam. The values were measured in the range from 0 to 300 mm. The dynamic pressure was measured using an apparatus comprising a nitrogen source, a reducing valve with manometer, a screw-threaded flow regulator, a wash bottle, a flow meter, a T-piece, a nozzle head and a scaled glass tube containing water. The nozzle head has an edge length of 100×100 mm, a weight of 800 g, a clear width of the exit orifice of 5 mm, a clear width of the lower applicator ring of 20 mm and an external diameter of the lower applicator ring of 30 mm.

The measurement is effected by adjusting the nitrogen supply pressure to 1 bar with the reducing valve and adjusting the flow rate to 480 l/h. The amount of water in the scaled glass tube is adjusted such that no pressure differential is built up and none can be read off. For the analysis of the test specimen having dimensions of 250×250×50 mm, the nozzle head is placed onto the corners of the test specimen, flush with the edges, and once onto the (estimated) middle of the test specimen (in each case on the side with the greatest surface area). The result is read off when a constant dynamic pressure has been established. Evaluation is effected by forming the average of the five measurements obtained.

f) Number of cells per cm (cell count): This is determined visually on a cut surface (measured to DIN EN 15702).

g) Indentation hardness CLD, 40% to DIN EN ISO 3386-1:1997+A1:2010. The measurements are reported in kilopascals (kPa).

h) Tensile strength and elongation at break to DIN EN ISO 1798:2008. The measurements of tensile strength are reported in kilopascals (kPa), and those of elongation at break in percent (%).

i) Rebound resilience to DIN EN ISO 8307:2007. The measurements are reported in percent (%).

Determination of Room Temperature Emission by the Test Chamber Test (TC)

The emission from the resulting foams made from formulation I was determined at room temperature in accordance with DIN EN ISO 16000-9:2008-04. Sampling was affected after 24 hours. For this purpose, 2 l of the test chamber atmosphere were passed through an adsorption tube filled with Tenax® TA (mesh35/60) at a flow rate of 100 ml/min. There follows a description of the procedure for the thermal desorption with subsequent gas chromatography-mass spectrometry coupling (GC-MS).
  a) Measurement technique: The thermal desorption was conducted with a "TDS2" thermal desorber with autosampler from Gerstel, Mülheim, in conjunction with an Agilent 7890/5975 GC/MSD system.
  b) The measurement conditions are reported in tables 5 and 6.

TABLE 5

Analysis parameters for thermal desorption for TC analysis

| | |
|---|---|
| Thermal desorption | Gerstel TDS2 |
| Desorption temperature | 280° C. |
| Desorption time | 5 min |
| Flow rate | 65 ml/min |
| Transfer line | 280° C. |
| Cryofocusing | KAS 4 |
| Liner | Glass vaporizer tube with silanized glass wool |
| Temperature | −150° C. |

TABLE 6

Gas chromatography-mass spectrometry analysis parameters for test chamber analysis

| | |
|---|---|
| GC | Capillary GC Agilent 7890 |
| Temperature programme | −150° C.; 1 min; ↗10° C./s; 280° C. |
| Column | Agilent 19091B-115, Ultra 2, 50 m * 0.32 mm FT 0.5 μm |
| Flow rate | 1.3 ml/min const. flow |
| Temperature programme | 50° C.; 2 min; ↗3° C./min; 92° C.; ↗5° C./min; 160° C.; ↗10° C./min; 280° C., 20 min |
| Detector | Agilent MSD 5975 |
| Evaluation | Evaluation of the total ion current chromatogram by calculation as toluene equivalent | c) For calibration, 2 μl of a mixture of toluene and hexadecane in methanol (0.125 mg/ml of each) were introduced into a cleaned adsorption tube filled with Tenax® TA (mesh35/60) and analysed (desorption 5 min; 280° C.).

Odour Testing of the Resulting Foams

The finished foams, produced according to formulation I, were packed in odour-neutral plastic bags and stored under airtight conditions. For the odour assessment of the foam, cubes measuring 10 cm×10 cm×10 cm were cut out and transferred to jars with a volume of 1 l, from which the samples were smelled. The jars were closed with a screw lid. The odour test took place after storing the jars for 24 hours at 22° C.

The odour test was assessed by a panel of 13 trained odour testers. They were questioned here about the intensity of the odour; a low odour level was rated +, moderate odour ++, and high odour +++.

Testing of the Storage Stability of the Inventive Additives

To test the storage stability, the inventive additives were stirred together in an activator solution consisting of water, amine catalysts, stabilizer and inventive additive, and dispensed into jars having a screw lid. After storage at 22° C. for 24 hours, analogously to the above-described procedure according to formulation I, this activator solution was admixed with polyol, tin catalyst and isocyanate, and the resulting foams were assessed in terms of open-cell content and cell structure.

Results of the Foaming Operations

The inventive additives of Examples 1-6, the non-inventive additive described in Example 7, and Niax® L626 and Niax® L627 from Momentive Performance Materials are tested hereinafter in formulations I-IV.

The results of the performance tests for the various formulations and the additives used are shown in Tables 7 to 12.

TABLE 7

Foaming results with use of various cell openers according to formulation I

| No. | Additive | Amount used [pphp] | Rise time [s] | Rise height [cm] | Fall-back [cm] | Porosity [mm] | Density [kg/m³] | Indentation hardness (CLD 40%) [kPa] | Cell count [cm⁻¹] | Tensile strength [kPa] | Ball rebound [%] | VOC [μg/m³] |
|---|---|---|---|---|---|---|---|---|---|---|---|---|
| 1 | reference | 0 | 187 [d] | n.d. | n.d. | n.d. | n.d. | n.d. | n.d. | n.d. | n.d. | n.d. |
| 2 | Niax ® L626 [a] | 0.5 | 181 [d] | n.d. | n.d. | n.d. | n.d. | n.d. | n.d. | n.d. | n.d. | n.d. |
| 3 | Niax ® L626 [a] | 1 | 158 | 33.1 | 0.4 | 30 | 36.5 | 0.6 | 15 | 27.7 | 5 | 1632 |
| 4 | Ex. 1 [b] | 1 | 151 | 31.6 | 0.2 | 22 | 38.1 | 0.5 | 15 | 38.8 | 6 | 81 |
| 5 | Ex. 2 [b] | 1 | 146 | 31.0 | 0.3 | 15 | 38.0 | 0.5 | 16 | 37.5 | 6 | 99 |
| 6 | Ex. 3 [b] | 1 | 161 | 32.3 | 0.3 | 28 | 37.6 | 0.7 | 16 | 48.3 | 5 | 75 |
| 7 | Ex. 4 [b] | 1 | 138 | 31.0 | 0.3 | 5 | 38.3 | 0.7 | 16 | 28.1 | 7 | 79 |
| 8 | Ex. 5 [b] | 1 | 144 | 31.1 | 0.1 | 8 | 38.1 | 0.5 | 15 | 26.3 | 7 | 121 |
| 9 | Ex. 6 [b] | 1 | 155 | 31.6 | 0.5 | 24 | 37.8 | 0.6 | 16 | 32.1 | 5 | 95 |
| 10 | Ex. 7 [c] | 1 | 195 [d] | n.d. | n.d. | n.d. | n.d. | n.d. | n.d. | n.d. | n.d. | n.d. |

[a] Comparative cell opener Niax ® L626 from Momentive Performance Materials

[b] Inventive additives, prepared according to Examples 1-6

[c] Non-inventive additive, prepared according to Example 7

[d] The foam rises up and does not blow off. Instead, the foam continues to rise for a long period (>2.5 min). In the course of subsequent cooling, the foam shrinks significantly. It was not possible to conduct a measurement of the physical properties because of the shrinkage.

TABLE 8

Odour testing of the foams according to formulation I by 13 trained olfactory testers

| No. | Additive | Amount used [pphp] | Intensity of the odour +++ | ++ | + |
|---|---|---|---|---|---|
| 11 | Niax ® L626[a] | 1 | 11 | 2 | 0 |
| 12 | Inventive additive from Ex. 1[b] | 1 | 0 | 3 | 10 |
| 13 | Inventive additive from Ex. 2[b] | 1 | 0 | 5 | 8 |
| 14 | Inventive additive from Ex. 3[b] | 1 | 1 | 6 | 6 |
| 15 | Inventive additive from Ex. 4[b] | 1 | 0 | 0 | 13 |
| 16 | Inventive additive from Ex. 5[b] | 1 | 2 | 3 | 8 |
| 17 | Inventive additive from Ex. 6[b] | 1 | 2 | 4 | 7 |

[a] Comparative cell opener Niax ® L626 from Momentive Performance Materials
[b] Inventive additives, prepared according to Examples 1-6

TABLE 9

Testing of storage stability of various cell openers according to formulation I

| No. | Additive | Amount used [pphp] | Rise time [s] | Rise height [cm] | Fall-back [cm] | Porosity [mm] | Cell count [cm$^{-1}$] |
|---|---|---|---|---|---|---|---|
| 18 | Niax ® L626 [a] | 1 | 184 [d] | n.d. | n.d. | n.d. | n.d. |
| 19 | Inventive additive from Ex. 1 [b] | 1 | 149 | 31.6 | 0.1 | 23 | 16 |
| 20 | Inventive additive from Ex. 2 [b] | 1 | 150 | 31.3 | 0.3 | 10 | 15 |
| 21 | Inventive additive from Ex. 3 [b] | 1 | 158 | 32.2 | 0.4 | 33 | 16 |
| 22 | Inventive additive from Ex. 4 [b] | 1 | 143 | 31.2 | 0.3 | 5 | 15 |
| 23 | Inventive additive from Ex. 5 [b] | 1 | 144 | 31.4 | 0.2 | 12 | 16 |
| 24 | Inventive additive from Ex. 6 [b] | 1 | 156 | 31.9 | 0.2 | 21 | 14 |

[a] Comparative cell opener Niax ® L626 from Momentive Performance Materials
[b] Inventive additives, prepared according to Examples 1-6
[d] The foam rises up and does not blow off. Instead, the foam continues to rise for a long period (>2.5 min). In the course of subsequent cooling, the foam shrinks significantly. It was not possible to conduct a measurement of the physical properties because of the shrinkage.

As shown in Table 7, without the use of a cell-opening additive with formulation I, a severely shrunken foam is obtained (entry 1). The use of 0.5 pphp of the comparative cell opener Niax® L626 from Momentive Performance Materials and the use of 1 pphp of the non-inventive additive prepared in Example 7 also lead to severely shrunken foams (entries 2 and 10). Through use of 1 pphp of the comparative cell opener Niax® L626 (entry 3) and through use of 1 pphp of the inventive additives described in Examples 1-6 (entries 4-9), it is possible to obtain foams having a sufficiently fine and open cell structure (foams are referred to as closed from about 300 mm water column). The foam characterized by the use of 1 pphp of Niax® L626 (entry 3) has an extremely high emission value (1632 μg/m$^3$); in contrast, the use of 1 pphp of the inventive additives prepared in Examples 1-6 leads to foams having extremely low emission values (75-121 μg/m$^3$, entries 4-9).

As shown in Table 8, the intensity of the odour of the foams which have been made with the inventive additives from Examples 1-6 (entries 12-17) is lower throughout than the odour of the foam which has been produced with the comparative cell opener Niax® L626 from Momentive Performance Materials (entry 11). A clear majority of the testers classifies the inventive samples as odour-neutral. The odour test was repeated twice more by the testers, and the aforementioned results were confirmed in precisely the same way. It is clear from the results that the testers assessed a foam which was treated with an inventive additive as being less intensely odorous.

It is apparent from Table 9 that the inventive additives from Examples 1-6, even after storage in an activator mixture consisting of water, amine catalysts, stabilizer and inventive additive for 24 hours, do not lose potency in terms of their action (entries 19-24). There is no variation either in the porosity or in the cell count compared to samples which have been foamed directly without storage in an activator mixture (Table 7, entries 4-9). In contrast to the comparative cell opener Niax® L626 (entry 18), the inventive additives are not degraded during storage in the activator mixture.

TABLE 10

Foaming results with use of various cell openers according to formulation II

| No. | Additive | Amount used [pphp] | Rise time [s] | Rise height [cm] | Fall-back [cm] | Porosity [mm] | Density [kg/m$^3$] | Indentation hardness (CLD 40%) [kPa] | Cell count [cm$^{-1}$] | Tensile strength [kPa] | Ball rebound [%] |
|---|---|---|---|---|---|---|---|---|---|---|---|
| 25 | reference | 0 | 201 [d] | n.d. | n.d. | n.d. | n.d. | n.d. | n.d. | n.d. | n.d. |
| 26 | Niax ® L627 [a] | 1 | 160 | 30.3 | 0.1 | 120 | 53.1 | 1.6 | 13 | 51.9 | 3 |
| 27 | Ex. 1 [b] | 0.5 | 167 | 30.1 | 0.0 | 118 | 53.0 | 1.6 | 13 | 73.9 | 4 |
| 28 | Ex. 2 [b] | 0.5 | 160 | 30.2 | 0.1 | 111 | 52.8 | 1.4 | 13 | 63.7 | 5 |
| 29 | Ex. 3 [b] | 0.5 | 177 | 31.3 | 0.4 | 133 | 52.3 | 1.5 | 12 | 61.8 | 6 |
| 30 | Ex. 4 [b] | 0.5 | 155 | 29.9 | 0.4 | 109 | 53.5 | 1.8 | 12 | 42.4 | 1 |
| 31 | Ex. 5 [b] | 0.5 | 163 | 30.3 | 0.3 | 120 | 53.0 | 1.5 | 14 | 89.4 | 3 |

TABLE 10-continued

Foaming results with use of various cell openers according to formulation II

| No. | Additive | Amount used [pphp] | Rise time [s] | Rise height [cm] | Fall-back [cm] | Porosity [mm] | Density [kg/m³] | Indentation hardness (CLD 40%) [kPa] | Cell count [cm⁻¹] | Tensile strength [kPa] | Ball rebound [%] |
|---|---|---|---|---|---|---|---|---|---|---|---|
| 32 | Ex. 6 [b] | 0.5 | 166 | 30.2 | 0.5 | 121 | 53.6 | 1.5 | 15 | 59.7 | 1 |
| 33 | Ex. 7 [c] | 0.5 | 189 [d] | n.d. | n.d. | n.d. | n.d. | n.d. | n.d. | n.d. | n.d. |

[a] Comparative cell opener Niax ® L627 from Momentive Performance Materials
[b] Inventive additives, prepared according to Examples 1-6
[c] Non-inventive additive, prepared according to Example 7
[d] The foam rises up and does not blow off. Instead, the foam continues to rise for a long period (>2.5 min). In the course of subsequent cooling, the foam shrinks significantly. It was not possible to conduct a measurement of the physical properties because of the shrinkage.

As shown in Table 10, without the use of a cell-opening additive with formulation II, a severely shrunken foam is obtained (entry 25). The use of 1 pphp of the non-inventive additive prepared in Example 7 also leads to severely shrunken foams (entry 33). Through use of the comparative cell opener Niax® L627 (entry 26) and through use of the inventive additives described in Examples 1-6 (entries 27-32), it is possible to obtain foams having a sufficiently fine and open cell structure (foams are referred to as closed from about 300 mm water column). What is remarkable is the fact that, in order to obtain comparatively open and fine foams, it is necessary to use 1 pphp of the comparative cell opener Niax L627, but only 0.5 pphp of the inventive additives prepared in Examples 1-6 is needed.

obtained (entry 34). The use of 1 pphp of the non-inventive additive prepared in Example 7 also leads to severely shrunken foams (entry 42). Through use of the comparative cell opener Niax® L627 (entry 35) and through use of the inventive additives described in Examples 1-6 (entries 36-41), it is possible to obtain foams having a sufficiently fine and open cell structure (foams are referred to as closed from about 300 mm water column). What is remarkable is the fact that, in order to obtain comparatively open and fine foams, it is necessary to use 0.7 pphp of the comparative cell

TABLE 11

Foaming results with use of various cell openers according to formulation III

| No. | Additive | Amount used [pphp] | Rise time [s] | Rise height [cm] | Fall-back [cm] | Porosity [mm] | Density [kg/m³] | Indentation hardness (CLD 40%) [kPa] | Cell count [cm⁻¹] | Tensile strength [kPa] | Ball rebound [%] |
|---|---|---|---|---|---|---|---|---|---|---|---|
| 34 | reference | 0 | 153 [d] | n.d. | n.d. | n.d. | n.d. | n.d. | n.d. | n.d. | n.d. |
| 35 | Niax ® L627 [a] | 0.7 | 108 | 33.0 | 0.0 | 190 | 49.1 | 2.0 | 14 | 58.7 | 7 |
| 36 | Ex. 1 [b] | 0.5 | 110 | 32.9 | 0.1 | 180 | 49.3 | 2.1 | 16 | 71.3 | 8 |
| 37 | Ex. 2 [b] | 0.5 | 113 | 32.8 | 0.2 | 173 | 49.3 | 2.3 | 15 | 67.5 | 5 |
| 38 | Ex. 3 [b] | 0.5 | 121 | 33.5 | 0.2 | 200 | 48.6 | 2.4 | 15 | 81.4 | 5 |
| 39 | Ex. 4 [b] | 0.5 | 105 | 32.1 | 0.0 | 167 | 49.5 | 1.9 | 16 | 67.5 | 6 |
| 40 | Ex. 5 [b] | 0.5 | 116 | 33.0 | 0.0 | 183 | 48.9 | 2.0 | 16 | 59.4 | 3 |
| 41 | Ex. 6 [b] | 0.5 | 119 | 33.1 | 0.1 | 182 | 48.9 | 2.1 | 15 | 63.1 | 7 |
| 42 | Ex. 7 [c] | 0.5 | 160 [d] | n.d. | n.d. | n.d. | n.d. | n.d. | n.d. | n.d. | n.d. |

[a] Comparative cell opener Niax ® L627 from Momentive Performance Materials
[b] Inventive additives, prepared according to Examples 1-6
[c] Non-inventive additive, prepared according to Example 7
[d] The foam rises up and does not blow off. Instead, the foam continues to rise for a long period (>2.5 min). In the course of subsequent cooling, the foam shrinks significantly. It was not possible to conduct a measurement of the physical properties because of the shrinkage.

As shown in Table 11, without the use of a cell-opening additive with formulation III, a severely shrunken foam is opener Niax L627, but only 0.5 pphp of the inventive additives prepared in Examples 1-6 is needed.

TABLE 12

Foaming results with use of various cell openers according to formulation IV

| No. | Additive | Amount used [pphp] | Rise time [s] | Rise height [cm] | Fall-back [cm] | Porosity [mm] | Density [kg/m³] | Indentation hardness (CLD 40%) [kPa] | Cell count [cm⁻¹] | Tensile strength [kPa] | Ball rebound [%] |
|---|---|---|---|---|---|---|---|---|---|---|---|
| 43 | reference | 0 | 181 [d] | n.d. | n.d. | n.d. | n.d. | n.d. | n.d. | n.d. | n.d. |
| 44 | Niax ® L626 [a] | 1 | 155 | 32.1 | 0.0 | 23 | 46.0 | 3.1 | 12 | 91.9 | 7 |
| 45 | Ex. 1 [b] | 1 | 150 | 31.7 | 0.2 | 30 | 46.0 | 2.6 | 12 | 128.3 | 8 |
| 46 | Ex. 2 [b] | 1 | 150 | 32.0 | 0.1 | 31 | 46.1 | 2.8 | 11 | 122.2 | 5 |
| 47 | Ex. 3 [b] | 1 | 156 | 32.4 | 0.3 | 41 | 45.3 | 2.6 | 12 | 114.9 | 6 |
| 48 | Ex. 4 [b] | 1 | 147 | 31.1 | 0.3 | 23 | 46.3 | 3.2 | 12 | 99.3 | 4 |

TABLE 12-continued

Foaming results with use of various cell openers according to formulation IV

| No. | Additive | Amount used [pphp] | Rise time [s] | Rise height [cm] | Fall-back [cm] | Porosity [mm] | Density [kg/m³] | Indentation hardness (CLD 40%) [kPa] | Cell count [cm⁻¹] | Tensile strength [kPa] | Ball rebound [%] |
|---|---|---|---|---|---|---|---|---|---|---|---|
| 49 | Ex. 5 [b] | 1 | 152 | 32.1 | 0.2 | 27 | 46.1 | 2.8 | 12 | 94.4 | 8 |
| 50 | Ex. 6 [b] | 1 | 155 | 32.4 | 0.4 | 28 | 46.0 | 2.9 | 14 | 104.7 | 5 |
| 51 | Ex. 7 [c] | 1 | 174 [d] | n.d. | n.d. | n.d. | n.d. | n.d. | n.d. | n.d. | n.d. |

[a] Comparative cell opener Niax ® L626 from Momentive Performance Materials
[b] Inventive additives, prepared according to Examples 1-6
[c] Non-inventive additive, prepared according to Example 7
[d] The foam rises up and does not blow off. Instead, the foam continues to rise for a long period (>2.5 min). In the course of subsequent cooling, the foam shrinks significantly. It was not possible to conduct a measurement of the physical properties because of the shrinkage.

As shown in Table 12, without the use of a cell-opening additive with formulation IV, a severely shrunken foam is obtained (entry 43). The use of 1 pphp of the non-inventive additive prepared in Example 7 also leads to severely shrunken foams (entry 51). Through use of 1 pphp of the comparative cell opener Niax® L626 (entry 44) and through use of 1 pphp of the inventive additives described in Examples 1-6 (entries 45-50), it is possible to obtain foams having a sufficiently fine and open cell structure (foams are referred to as closed from about 300 mm water column).

While the present invention has been particularly shown and described with respect to preferred embodiments thereof, it will be understood by those skilled in the art that the foregoing and other changes in forms and details may be made without departing from the spirit and scope of the present invention. It is therefore intended that the present invention not be limited to the exact forms and details described and illustrated, but fall within the scope of the appended claims.

What is claimed as new is:

1. A method of producing a polyurethane foam, said method comprising:
   foaming a mixture to provide said polyurethane foam, said mixture comprising at least one isocyanate component, at least one polyol component, a blowing agent component comprising water and optionally a physical blowing agent, a stabilizer, and an additive comprising siloxane block polymers of the average general formula (I):

$$M_a M^1_b D_c D^1_d T_e Q_f G_g$$

with $$M = R-\underset{R}{\underset{|}{\overset{R}{\overset{|}{Si}}}}-O_{1/2} \quad M^1 = R^1-\underset{R}{\underset{|}{\overset{R}{\overset{|}{Si}}}}-O_{1/2}$$

$$D = O_{1/2}-\underset{R}{\underset{|}{\overset{R}{\overset{|}{Si}}}}-O_{1/2} \quad D^1 = O_{1/2}-\underset{O_{1/2}}{\underset{|}{\overset{R^1}{\overset{|}{Si}}}}-O_{1/2}$$

$$T = O_{1/2}-\underset{O_{1/2}}{\underset{|}{\overset{R}{\overset{|}{Si}}}}-O_{1/2} \quad Q = O_{1/2}-\underset{O_{1/2}}{\underset{|}{\overset{O_{1/2}}{\overset{|}{Si}}}}-O_{1/2}$$

G are radicals, same or different, selected from the group consisting of:

$$(O_{1/2})_n-SiR_m-CH_2CHR^3-R^2-CHR^3CH_2-SiR_m-(O_{1/2})_n,$$

$$(O_{1/2})_n-SiR_m-CH_2CHR^3-R^2-CR^3=CH_2, \text{ and}$$

$$(O_{1/2})_n-SiR_m-CH_2CHR^3-R^2-CR^3=CR^3-CH_3,$$

a=1 to 8,
   b=1 to 8,
   c=3-450,
   d=1-30,
   e=0-20,
   f=0-20,
   g=0.15 to 2,
   where a+b≥2, a+b+c+d+e+f+g=N, and N is ≥11 and ≤500, and b+d≥1,
   R are radicals, same or different, having 1-16 carbon atoms or aryl radicals having 6-16 carbon atoms or H or —OR³,
   R¹ are polyether radicals having a formula (II)

$$-(CH_2)_h-O-(CH_2CH_2O)_i-(CH_2CH(CH_3)O)_j- \quad \text{formula (II)}$$
   $$-(CH(CH_3)CH_2O)_k-(CR^4_2CR^4_2O)_l-R^5$$

wherein
   R⁴ are alkyl radicals, same or different, which have from 1 to 18 carbon atoms, and optionally have ether functions, or aryl radicals which have from 6-18 carbon atoms and optionally have ether functions, or H,
   R⁵ are radicals, same or different, wherein R⁵ is selected from the group consisting of: R³, H, and —C(O)R³,
   h is from 2 to 18,
   i is from 0 to 40,
   j is from 1 to 40,
   k is from 0 to 40,
   l is from 0 to 30,
   wherein i+j+k+l≥3,
   R² are divalent organic radicals, same or different, which have 2-20 carbon atoms and are optionally interrupted by ether, ester or amide functions or (—SiR₂O—)ₙ groups and optionally bear OH functions,
   R³ are alkyl radicals, same or different, having 1-16 carbon atoms or aryl radicals having 6-16 carbon atoms or H,
   n=independently 1 or 2,
   m=independently 1 or 2,
   m+n=3,
   wherein said at least one polyol component has an average hydroxyl number, determined to DIN 53240-1:

2012-07, of greater than 56 to less than 450 mg KOH/g, and wherein said polyurethane foam is produced at an isocyanate index of 65 to 108 and has an open cell structure, wherein said bonded siloxane block copolymers of the average general formula (I) are present in an amount of from 0.001 to 10 parts by weight per 100 parts of said at least one polyol component, and wherein said at least one polyol component is present in an amount from 25% to 80% by weight of said mixture, water is present in an amount from 1% to 5% by weight of said mixture, catalysts are present in an amount from 0.01% to 1% by weight of said mixture, said physical blowing agent is present in an amount from 0% to 50% by weight of said mixture, said stabilizer is present in an amount of up to 5% by weight of said mixture, said at least one isocyanate component is present in an amount from 20% to 60% by weight of said mixture, and said additive is present in an amount from 0.001% to 10% by weight of said mixture.

2. The method of claim 1, wherein said polyurethane foam is a viscoelastic polyurethane foam.

3. The method of claim 1, wherein each of said bonded siloxane block polymers of the average general formula (I) functions as a cell opener.

4. The method of claim 1, wherein each of said bonded siloxane block polymers of the average general formula (I) is employed in the form of an additive composition comprising from 0% to 90% by weight of one or more solvents.

5. The method of claim 1, wherein said mixture further comprises a reactive amine and/or amine having a molar mass greater than 100 g/mol as a catalyst.

6. The method of claim 1, wherein said at least one isocyanate component comprises tolylene diisocyanate (TDI), methylene diphenyl diisocyanate (MDI), MDI-based isocyanates or mixtures thereof.

7. The method of claim 1, wherein at least 5% by weight of the total weight of said bonded siloxane block copolymers of the average general formula (I) has a molar mass of greater than 50 000.

8. A composition suitable for production of polyurethane foam comprising: a polyol component comprising at least one polyol having a hydroxyl number greater than 100 mgKOH/g, a blowing agent component comprising water and optionally a physical blowing agent, an additive, an amine catalyst, wherein the polyol component has an average hydroxyl number, determined to DIN 53240-1:2012-07, of greater than 56 to less than 450 mg KOH/g, and said additive comprises bonded siloxane block polymers of the average general formula (I):

$M_a M^1_b D_c D^1_d T_e Q_f G_g$ with

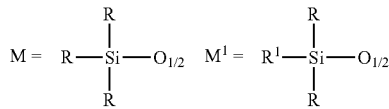

-continued

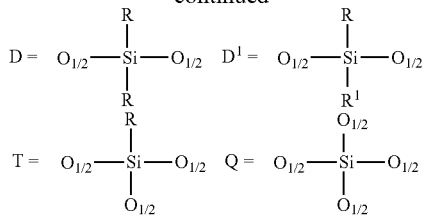

G are radicals, same or different, selected from the group consisting of:

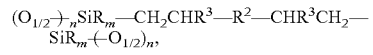

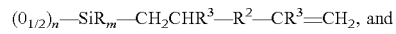

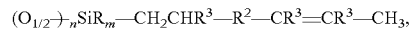

a=2.4 to 4.1,
b=2 to 8,
c=10 to 250,
d=1-30,
e=0-20,
f=0-20,
g=0.1-3,
where a+b≥2, a+b+c+d+e+f+g=N, and N is ≥11 and ≤500, and b+d≥1,
R are radicals, same or different, having 1-16 carbon atoms, or aryl radicals having 6-16 carbon atoms, or H, or —OR³,
R¹ are polyether radicals having a formula (II)

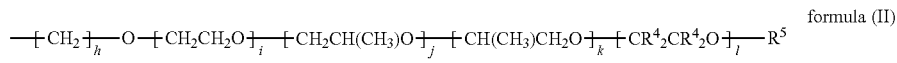

formula (II)

wherein
R⁴ are alkyl radicals, same or different, which have 1 to 18 carbon atoms, and optionally have ether functions, or aryl radicals which have 6-18 carbon atoms and optionally have ether functions, or H,
R⁵ are radicals, same or different, wherein R⁵ is selected from the group consisting of: R³, H, and —C(O)R³,
h is from 2 to 18,
i is from 0 to 40,
j is from 1 to 40,
k is from 1 to 40,
l is from 0 to 30,
wherein i+j+k+l≥3,
R² are divalent organic radicals, same or different, which have 2-20 carbon atoms and are optionally interrupted by ether, ester or amide functions or (—SiR₂O-)ₙ groups and optionally bear OH functions,
R³ are alkyl radicals, same or different, having 1-16 carbon atoms or aryl radicals having 6-16 carbon atoms or H,
n=independently 1 or 2,
m=independently 1 or 2,
m+n=3,
wherein said polyurethane foam is produced at an isocyanate index of 65 to 108 and has an open cell structure,
wherein said polyol component is present in an amount from 25% to 80% by total weight of said composition, water is present in an amount from 1% to 5% by total weight of said composition, said amine catalyst are present in an amount from 0.01% to 1% by total weight of said composition, wherein said physical blowing agent is present in an amount from 0% to 50% by total weight of said composition, a stabilizer is present in an amount of up to 5% by total weight of said composition, at least one isocyanate component is present in an amount from 20% to 60% by total weight of said composition, and said additive is present in an amount from 0.001% to 10% by total weight of said composition.

9. A composition suitable for production of polyurethane foam comprising: a polyol component comprising at least one polyol having a hydroxyl number of greater than 100 mg KOH/g, a di- or polyfunctional isocyanate, an additive, and at least one of an amine catalyst, a metallic catalyst, a stabilizer, a blowing agent component comprising water and optionally a physical blowing agent, a flame retardant, an antioxidant, a color paste, a biocide, a filler and a crosslinker, wherein the polyol component has an average hydroxyl number, determined to DIN 53240-1:2012-07, of greater than 56 to less than 450 mg KOH/g, and said additive comprises bonded siloxane block polymers of the average general formula

with

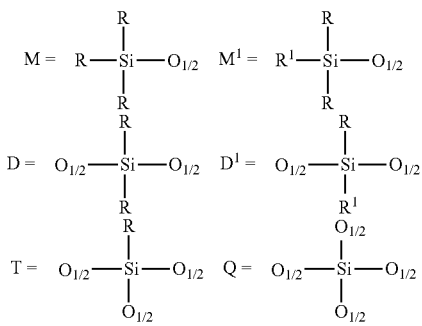

G are radicals, same or different, selected from the group consisting of:

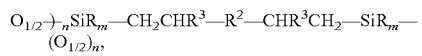

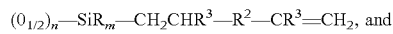

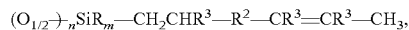

a=2.4 to 4.1,
b=2 to 8,
c=10 to 250,
d=1-30,
e=0-20,
f=0-20,
g=0.1-3,
where a+b≥2, a+b+c+d+e+f+g=N, and N is ≥11 and ≤500, and b+d≥1,
R are radicals, same or different, having 1-16 carbon atoms or aryl radicals having 6-16 carbon atoms or H or $-OR^3$,
$R^1$ are polyether radicals having a formula (II)

wherein
$R^4$ are alkyl radicals, same or different, which have 1 to 18 carbon atoms, and optionally have ether functions, or aryl radicals which have 6-18 carbon atoms and optionally have ether functions, or H,
$R^5$ are radicals, same or different, wherein $R^5$ is selected from the group consisting of: $R^3$, H, and $-C(O)R^3$,
h is from 2 to 18,
i is from 0 to 40,
j is from 1 to 40,
k is from 1 to 40,
l is from 0 to 30,
wherein i+j+k+l≥3,
$R^2$ are divalent organic radicals, same or different, which have 2-20 carbon atoms and are optionally interrupted by ether, ester or amide functions or $(-SiR_2O-)_n$ groups and optionally bear OH functions,
$R^3$ are alkyl radicals, same or different, having 1-16 carbon atoms or aryl radicals having 6-16 carbon atoms or H,
n=independently 1 or 2,
m=independently 1 or 2,
m+n=3,
wherein said polyurethane foam is produced at an isocyanate index of 65 to 108 and has an open cell structure,
wherein said composition further comprises a reactive amine and/or amine having a molar mass greater than 100 g/mol as a catalyst,
wherein said bonded siloxane block copolymers of the average general formula (I) are present in an amount of from 0.001 to 10 parts by weight per 100 parts of said at least one polyol component, and
wherein said polyol component is present in an amount from 25% to 80% by weight of said composition, water is present in an amount from 1% to 5% by weight of said composition, catalysts are present in an amount from 0.01% to 1% by weight of said composition, said physical blowing agent is present in an amount from 0% to 50% by weight of said composition, said stabilizer is present in an amount of up to 5% by weight of said composition, said di- or polyfunctional isocyanate component is present in an amount from 20% to 60% by weight of said composition, and said additive is present in an amount from 0.001% to 10% by weight of said composition.

10. The method of claim 2, wherein each of said bonded siloxane block polymers of the average general formula (I) functions as a cell opener.

11. The method of claim 2, wherein each of said bonded siloxane block polymers of the average general formula (I) is employed in the form of an additive composition comprising 0% to 90% by weight of one or more solvents.

12. The method of claim 2, wherein each of said bonded siloxane block copolymers of the average general formula (I) is present in an amount of 0.001 to 10 parts by weight per 100 parts of said at least one polyol component.

13. The method of claim 2, wherein said mixture further comprises a reactive amine and/or amine having a molar mass greater than 100 g/mol as a catalyst.

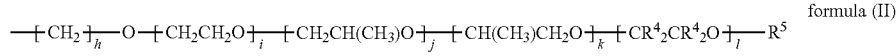

formula (II)

14. The method of claim 2, wherein said at least one isocyanate component comprises tolylene diisocyanate (TDI), methylene diphenyl diisocyanate (MDI), MDI-based isocyanates or mixtures thereof.

15. The composition of claim 8, wherein each of said bonded siloxane block polymers of the average general formula (I) functions as a cell opener.

16. The composition of claim 8, wherein each of said bonded siloxane block polymers of the average general formula (I) is employed in the form of an additive composition comprising from 0% to 90% by weight of one or more solvents.

17. The composition of claim 8, wherein each of said bonded siloxane block copolymers of the average general formula (I) is present in an amount of from 0.2 to 5 parts by weight per 100 parts of said polyol component.

* * * * *